(12) United States Patent
Schreck et al.

(10) Patent No.: US 7,509,728 B1
(45) Date of Patent: Mar. 31, 2009

(54) METHOD FOR ADJUSTING HEAD-TO-DISK SPACING IN A DISK DRIVE

(75) Inventors: Erhard Schreck, San Jose, CA (US); Francis P. Crimi, Los Altos, CA (US); Duc Bahn, San Jose, CA (US); Thao Anh Nguyen, San Jose, CA (US); Kazuhiro Saito, San Jose, CA (US); Donald J. Brunnett, Pleasanton, CA (US); Andrew LeFebvre, Campbell, CA (US); Scott Hughes, Cupertino, CA (US); Brian Strom, Cupertino, CA (US); Michael Mallary, Sterling, MA (US); Hyunchul Shim, Milpitas, CA (US); Bruce C. Schardt, Tracey, CA (US)

(73) Assignee: Maxtor Corporation, Scotts Valley, CA (US)

( * ) Notice: Subject to any disclaimer, the term of this patent is extended or adjusted under 35 U.S.C. 154(b) by 350 days.

(21) Appl. No.: 11/101,298

(22) Filed: Apr. 7, 2005

Related U.S. Application Data

(60) Provisional application No. 60/560,832, filed on Apr. 8, 2004.

(51) Int. Cl.
*G11B 21/02* (2006.01)
(52) U.S. Cl. .................. 29/603.03; 29/603.09; 360/75; 360/294.7
(58) Field of Classification Search ............. 29/603.03, 29/603.04, 603.09; 360/75, 294.7
See application file for complete search history.

(56) References Cited

U.S. PATENT DOCUMENTS

| | | | |
|---|---|---|---|
| 4,777,544 A | 10/1988 | Brown et al. | |
| 5,377,058 A | * 12/1994 | Good et al. | ................... 360/75 |
| 5,421,943 A | 6/1995 | Tam et al. | |
| 5,539,592 A | 7/1996 | Banks et al. | |
| 5,677,808 A | 10/1997 | Cha et al. | |

(Continued)

OTHER PUBLICATIONS

U.S. Appl. No. 10/211,671, filed Aug. 2, 2002, McKenzie et al.

*Primary Examiner*—A. Dexter Tugbang
*Assistant Examiner*—Livius R Cazan
(74) *Attorney, Agent, or Firm*—Westman, Champlin & Kelly, P.A.

(57) ABSTRACT

A method for manufacturing a first disk drive includes incorporating a first storage disk having a first storage surface, and a first slider having a first read/write head and a slider mover into the first disk drive. Further, the first read/write head is movably positioned a first head-to-disk spacing relative to the first storage surface. The method also includes determining an incremental power level necessary to be delivered to a second slider mover of a second slider having a second read/write head to adjust a second head-to-disk spacing relative to a second storage surface by a predetermined increment. In addition, the method includes adjusting a first head-to-disk spacing by directing an operational power level to the first slider mover. The operational power level is derived from the incremental power level. The step of determining an incremental power level can include directing power to the second slider mover and detecting approximately when a portion of the second slider first contacts the second storage surface. Moreover, the step of adjusting can be performed during one or more manufacturing operations of the first disk drive.

57 Claims, 10 Drawing Sheets

U.S. PATENT DOCUMENTS

| | | |
|---|---|---|
| 5,862,015 A | 1/1999 | Evans et al. |
| 5,880,626 A | 3/1999 | Dean |
| 5,880,899 A | 3/1999 | Blachek et al. |
| 5,959,801 A | 9/1999 | Gillis et al. |
| 5,965,840 A | 10/1999 | Nagarajan et al. |
| 5,991,113 A | 11/1999 | Meyer et al. |
| 5,999,372 A | 12/1999 | Peterson et al. |
| 6,011,239 A | 1/2000 | Singh et al. |
| 6,195,219 B1 | 2/2001 | Smith |
| 6,288,856 B1 | 9/2001 | Ottesen et al. |
| 6,359,746 B1 | 3/2002 | Kakekado et al. |
| 6,452,740 B1 | 9/2002 | Ghoshal |
| 6,538,836 B1 | 3/2003 | Dunfield et al. |
| 6,636,374 B1 | 10/2003 | Goh et al. |
| 6,735,036 B1 | 5/2004 | Olim |
| 6,757,124 B2 | 6/2004 | Kelemen |
| 6,768,610 B1 | 7/2004 | Morris et al. |
| 7,095,587 B2 | 8/2006 | Kurita et al. |
| 7,158,325 B1 * | 1/2007 | Hu et al. .................. 360/69 |
| 2001/0030822 A1 | 10/2001 | Boutaghou et al. |
| 2002/0067565 A1 | 6/2002 | Kelemen |
| 2002/0097528 A1 | 7/2002 | Williams et al. |
| 2003/0011915 A1 | 1/2003 | Riddering et al. |
| 2003/0174430 A1 | 9/2003 | Takahashi et al. |
| 2003/0193727 A1 | 10/2003 | Fioravanti et al. |
| 2005/0052773 A1 | 3/2005 | Suk |
| 2005/0057841 A1 | 3/2005 | Stover et al. |
| 2005/0078400 A1 | 4/2005 | Hassan |

* cited by examiner

| Head | Power Level (PL) (mW) | PL$_{Low}$ x 0.9 (mW) | PL (mean) (mW) | PL (mean) x 0.9 (mW) |
|---|---|---|---|---|
| H$_1$ | 22 | 19.8 | 22 | 19.8 |
| H$_2$ - H$_n$ | 18.0 - 24.0 | 16.2 | 21.3 | 19.17 |
Fig. 4A
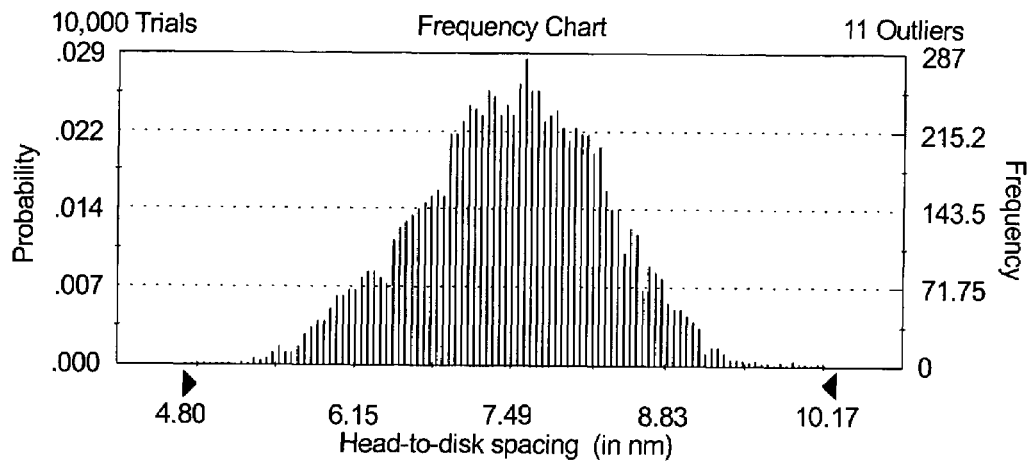
Fig. 4B
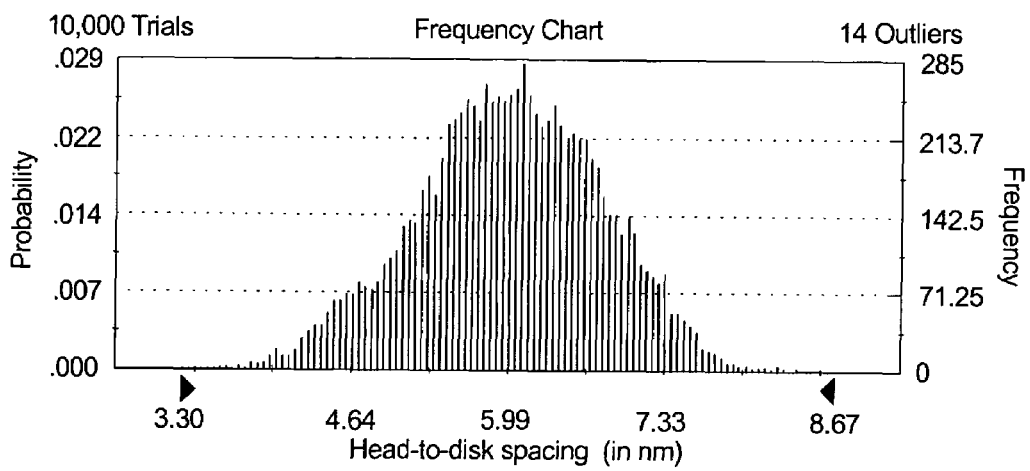
Fig. 4C

METHOD FOR ADJUSTING HEAD-TO-DISK SPACING IN A DISK DRIVE

RELATED APPLICATION

This application claims the benefit on U.S. Provisional Application Ser. No. 60/560,832 filed on Apr. 8, 2004. The contents of U.S. Provisional Application Ser. No. 60/560,832 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider having an air bearing surface, and a read/write head that transfers information to and from the storage disk. The rotation of the storage disk causes the slider to ride on an air bearing so that the read/write head is at a distance from the storage disk that is referred to as a "head-to-disk spacing" (also sometimes referred to herein as a "flying height").

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data. Thus, the range between head-to-disk contact and a desirable head-to-disk spacing has become extremely small, requiring an increasingly more accurate control system.

During in-situ usage of the disk drive, the temperature of the slider typically varies. For example, during a write operation, the electrical resistance of the write element generates heat in and around the read/write head, resulting in thermal expansion of the write pole tips toward the storage disk. The situation is commonly referred to a write pole tip protrusion ("WPTP"). If the WPTP is too extensive, the slider can unintentionally contact the storage disk, causing off-track writing, damage to the slider or damage to the storage disk. However, during the manufacturing process, the temperature of the slider is normally lower than during in-situ usage. Further, the variation in head-to-disk spacing is usually not as pronounced during certain manufacturing processes as opposed to in-situ operation.

SUMMARY

The present invention is directed to a method for manufacturing a disk drive. In one embodiment, the method includes incorporating a first storage disk having a first storage surface, and a first slider having a first read/write head and a slider mover into the first disk drive. The first read/write head is movably positioned a first head-to-disk spacing relative to the first storage surface. The method further includes determining an incremental power level necessary to be delivered to a second slider mover of a second slider having a second read/write head. The incremental power level is the level that is necessary to adjust a second head-to-disk spacing relative to a second storage surface by a predetermined increment. In this embodiment, the method also includes adjusting a first head-to-disk spacing by directing an operational power level to the first slider mover. The operational power level is based on the incremental power level. Moreover, in one embodiment, the step of adjusting is performed during one or more manufacturing operations.

Thus, in some embodiments, the operational power level used relative to one slider mover is derived from the incremental power level used relative to another slider mover, which may or may not be included in the same disk drive. In one embodiment, the second slider is positioned within a second disk drive that is substantially similar to the first disk drive. Further, the step of determining an incremental power level can include determining a range of incremental power levels to a plurality of slider movers necessary to change a plurality of head-to-disk spacings by the predetermined increment. The step of adjusting can also include multiplying the incremental power level by a constant to determine the operational power level. In another embodiment, the step of determining the operational power level can include basing the operational power level on an average of the range of incremental power levels. The step of adjusting can include directing the operational power level to the first slider mover to decrease the first head-to-disk spacing.

In addition, or in an alternative embodiment, the step of determining an incremental power level can include directing power to the second slider mover and detecting approximately when a portion of the second slider first contacts the second storage surface. In this embodiment, the step of detecting can include monitoring an amplitude of a position error signal. Further, the step of detecting can include directing a plurality of pulses to the second slider mover at a pulse frequency that is a multiple of a rotation frequency of the second storage surface. Alternatively, the step of detecting can include monitoring current that is directed to an actuator motor that positions the second slider relative to the second storage surface. In this embodiment, at least a portion of the current to the actuator motor is dependent upon the amplitude of the position error signal from the second slider.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4A is a table that includes one or more incremental power levels that can be used to determine an operational power level that is directed to the slider mover;

FIG. 4B is a graphical representation of a distribution of head-to-disk spacings for a plurality of read/write heads prior to directing the operational power level to a slider mover positioned near each read/write head to adjust the head-to-disk spacing; and FIG. 4C is a graphical representation of a distribution of head-to-disk spacings for a plurality of read/write heads following directing the operational power level to a slider mover positioned near each read/write head to adjust the head-to-disk spacing.

DESCRIPTION

The present invention is directed toward a method of manufacturing a disk drive that increases reliability and accuracy. As described in detail below, the head-to-disk spacing can be adjusted using a slider mover that can cause an incremental decrease in the head-to-disk spacing in the disk drive during one or more manufacturing processes.

Figure 1:
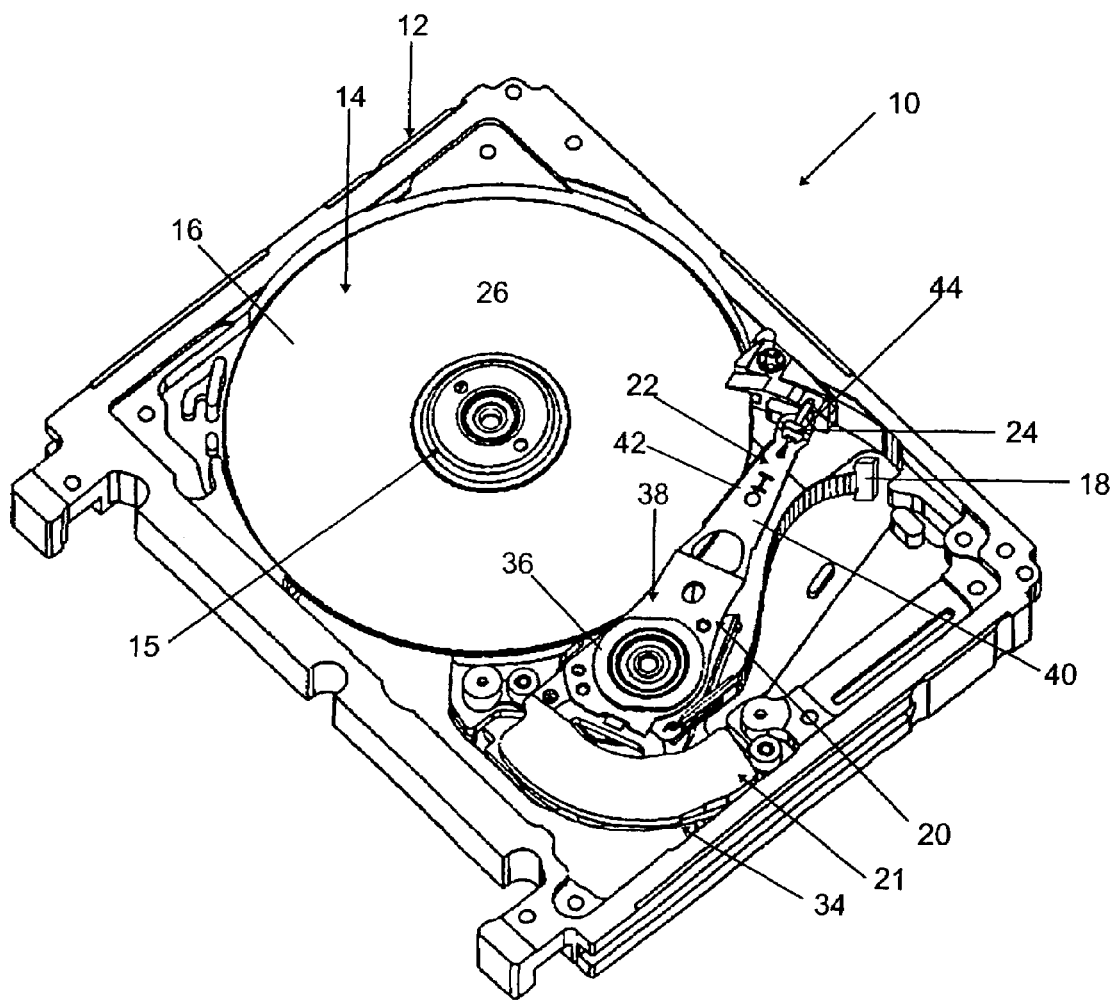
FIG. 1 is a perspective view of a disk drive having features of the present invention.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a drive circuitry 18, and (iv) a head stack assembly 20 including an actuator assembly 21 and one or more head suspension assemblies 22, with each head suspension assembly 22 including a slider 24.

Each storage disk 16 includes one or more disk surfaces 26 that each has a plurality of concentric data tracks (not shown) that store data, including a target track. Further, the storage disk 16 can also include non-data tracks, such as servo tracks. Data is read from the storage disk 16 during a read operation and data is transferred to the storage disk 16 during a write operation. The read and write operations can each include a seek mode during which the actuator assembly 21 rapidly moves the slider assembly 24 to near the target track. The read and write operations can also include a settle mode which commences once the slider assembly 24 is positioned proximate the target track. Further, the read and write operations include a track following mode once the slider assembly 24 has settled or stabilized over the target track. Additionally, once the slider assembly 24 stabilizes over the target track, the read and/or write operations include the transfer of data between the slider assembly 24 and the storage disk 16.

The drive circuitry 18 sends and/or receives electrical current from the slider assembly 24 during read and/or write operations of the disk drive 10. Moreover, the drive circuitry 18 can control several additional functions within the disk drive 10. As provided herein, the drive circuitry 18 can receive signals from the slider assembly 24 and/or other components of the disk drive 10, which can be used to detect contact between the slider assembly 24 and the storage disk 16. Further, the drive circuitry 18 can direct current to the slider assembly 24 to dynamically adjust and control the spacing between portions of the slider assembly 24 and the storage disk 16.

The drive circuitry 18 can be included in a printed circuit board assembly (not shown). Further, the drive circuitry 18 can include one or more preamplifiers that can adjust and/or amplify the electrical signals that are transmitted between the slider assembly 24 and other components of the drive circuitry 18. In one embodiment, the drive circuitry 18 is secured to and/or enclosed by the drive housing 12.

The head stack assembly 20 illustrated in FIG. 1 also includes an actuator motor 34, an actuator hub 36, one head suspension assembly 22, and an actuator arm 38. The actuator motor 34 rotates the actuator arm 38 and the head suspension assembly 22 relative to the storage disk 16. The head stack assembly 20, alternately, can include a plurality of actuator arms 38 that each supports up to two head suspension assemblies 22. Each head suspension assembly 22 includes one slider 24 and a suspension 40 having a load beam 42 and a flexure 44. The suspension 40 is secured to the actuator arm 38, and supports the slider 24 proximate one of the disk surfaces 30 of the storage disk 16.

The slider 24 transfers information between the drive circuitry 18 and the storage disk 16. The design of the slider 24 can vary pursuant to the teachings provided herein. Further, various embodiments of disk drives and slider assemblies are described in co-pending U.S. patent application Ser. No. 10/211,671, filed by McKenzie, et al. on Aug. 2, 2002, and assigned to Maxtor Corporation. The contents of U.S. patent application Ser. No. 10/211,671 are incorporated herein by reference.

Figure 2A:
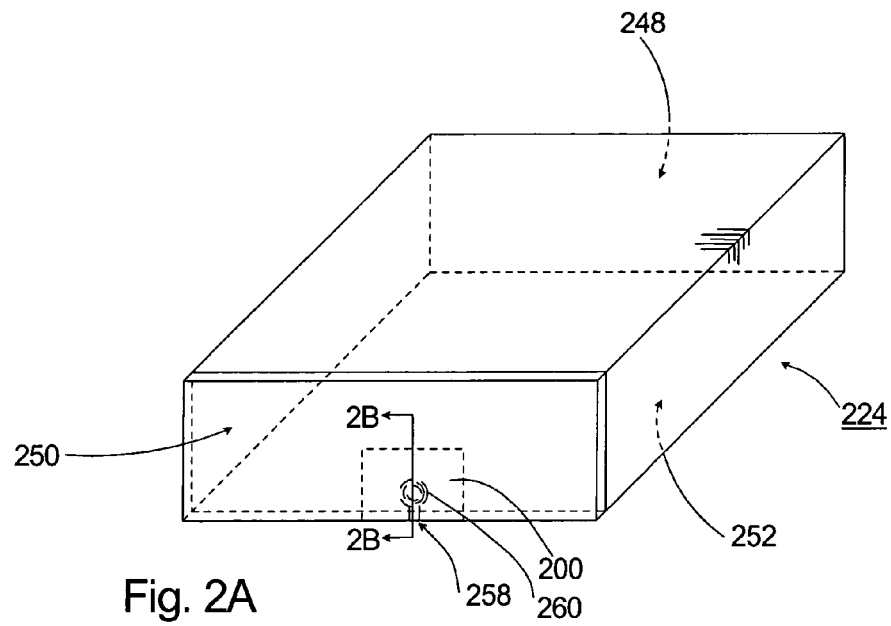
FIG. 2A is a perspective view of a slider having features of the present invention including a slider mover.

FIG. 2A illustrates a rear perspective view of one embodiment of the slider 224. In this embodiment, the slider 224 includes a read/write head 258 and a slider mover 200 (illustrated in phantom) that moves the read/write head 258 to precisely control the head-to-disk spacing. In one embodiment, the slider mover 200 is a slider deformer that selectively deforms a portion of the slider 224 near the read/write head 258 in order to move the head 258 and change the head-to-disk spacing. The read/write head 258 includes a write element 260 (illustrated in phantom). The slider 224 further includes a leading surface 248, an opposed trailing surface 250 and a flying surface 252, which forms an air bearing surface (ABS) of the slider 224.

Figure 2B:
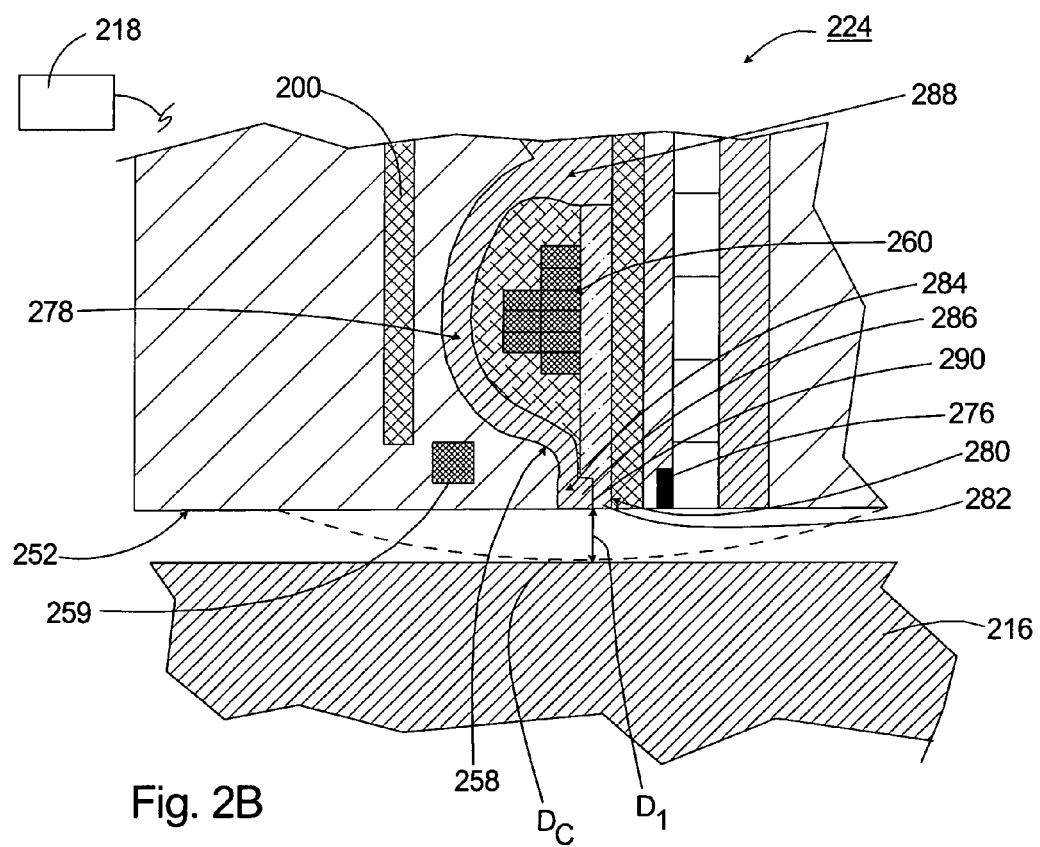
FIG. 2B is an enlarged cross-sectional view of a portion the slider of FIG. 2A while a first non-contact power level and a contact power level are directed to the slider mover.

FIG. 2B is an enlarged, partial cross-sectional illustration of the slider 224 shown in FIG. 2A, and a portion of a storage disk 216. FIG. 2B illustrates that the slider 224 includes the read/write head 258 and a temperature sensor 259. The read/write head 258 includes a read head 276 and a write head 278. The temperature sensor 259 is used to sense the temperature of a portion of the slider 224. Further, the temperature sensor 259 can relay temperature data to the drive circuitry 28 for processing, as provided in greater detail below.

The positioning and number of slider movers 200 can be varied. Moreover, the composition and geometry of the slider mover 200 can be varied to suit the design requirements of the slider 224 and the disk drive 10. For example, the slider mover 200 can be a heating element, e.g. a coil that is positioned as a planar layer that is substantially parallel to the trailing surface 250. With this design, current directed to the coil generates heat that causes a controlled thermal deformation of the area surrounding the coil. Alternatively, for example, the slider mover 200 can be non-planar and/or positioned to not be parallel to the trailing surface 250.

In FIG. 2B, the slider mover 200 is not in direct electrical communication with the write element 260. Stated another way, the slider mover 200 can be substantially electrically isolated and/or decoupled from the write element 260, e.g. the slider mover 200 is not in direct contact with the write element 260, nor is there any significant electrical coupling between the slider mover 200 and the write element 260. Alternatively, the slider mover 200 and the write element 260 can be electrically coupled, or they can be directly connected.

The amount in which the slider mover 200 can adjust the head-to-disk spacing will vary according to the design of the slider 224 and the slider mover 200. Further, the level in which the drive circuitry 28 directs power to the slider mover 200 will vary according to the design of the slider 224, the slider mover 200, and the amount of head-to-disk spacing adjustment necessary. For example, in one embodiment, the drive circuitry 28 can direct power to the slider mover 200 at any rate between approximately 0 mW and 100 mW.

The positioning and design of the write head 278 can be varied. In the embodiment illustrated in FIG. 2B, the write head 278 includes a leading pole 280 having a leading pole tip 282, a trailing pole 284 having a trailing pole tip 286, a yoke 288, and a write head gap 290.

More specifically, FIG. 2B illustrates an actual head-to-disk spacing $D_1$ when the drive circuitry 218 is directing a first non-contact power level to the slider mover 200. As used herein, the first non-contact power level can be a relatively low level of power, zero power, or any power that does not cause contact between the slider 224 and the storage disk 216. At various times during manufacturing or post-manufacturing operation of the disk drive, little or no power is directed to the slider mover 200, and little or no deformation occurs in the area of the read/write head 258 or the flying surface 252, as illustrated in FIG. 2B. As referred to herein, during times when the read/write head 258 is not contacting the storage disk 216, the slider 224 is said to be in a non-contact position.

FIG. 2B also illustrates in phantom, the deformed flying surface 252D and the relationship between the actual head-to-disk spacing $D_C$ that occurs when the drive circuitry 218 is directing a contact power level to the slider mover 200. The contact power level represents at least a minimum amount of power to cause movement, e.g. a sufficient thermal expansion, of a portion of the slider 224 that results in relatively consistent, non-destructive physical contact between the slider 224 and the storage disk 216.

As referred to herein, upon head-to-disk contact, the slider 224, including the read/write head 258, is said to be in a contact position relative to the storage disk 216. The portion of the slider 224 illustrated in phantom is shown as a relatively smooth curve for purposes of illustration and to show the contrast with the slider 224 in the non-contact position (illustrated by solid lines). It is recognized that when the slider 224 is in the contact position, the actual configuration of the slider 224, including the read/write head 258 may not be completely smooth, but can have a somewhat jagged or otherwise inconsistent configuration.

Consistent contact between the slider 224 and the storage disk 216 is also referred to herein as "head-to-disk contact". Further, during head-to-disk contact, the head-to-disk spacing is approximately equal to 0 nm. As used herein, head-to-disk contact is distinguished from sporadic or anomalous contact that occurs when the slider 224 contacts a thermal asperity (not shown) or some other surface deviation on the storage disk 216, which normally has a duration on the order of less than one microsecond up to approximately 3 microseconds in some cases.

In contrast, head-to-disk contact as used herein has a duration that is sufficient to establish non-anomalous contact between the slider 224 and the storage disk 216, such as a relatively consistent flying height of 0 nm. Stated another way, the disk drive 10 and methods provided herein facilitate a determination of head-to-disk contact having a requisite duration that establishes a substantially constant flying height or head-to-disk spacing of 0 nm. In one embodiment, non-anomalous head-to-disk contact has a duration that is greater than approximately 10 microseconds. In alternative, non-exclusive embodiments, head-to-disk contact can have a duration that is greater than approximately 25, 50, 100, 500, 1,000 or 2,000 microseconds which is recognized by one or more of the methods provided herein. Head-to-disk contact of this relatively long duration clearly establishes non-anomalous contact between the read/write head 258 and the storage disk 216.

As provided herein, head-to-disk contact can be intentionally induced during production, self-testing or optimization processing of the disk drive, and/or on a predetermined (automatic) or an "as needed" (manual) basis during post-manufacturing, in-situ operation of the disk drive 10. For example, head-to-disk contact can be intentionally caused before, during or after self-testing and/or optimization process of the disk drive 10. In one embodiment, by purposely causing non-destructive head-to-disk contact and/or withdrawing the slider 224 from non-destructive head-to-disk contact, and by providing the ability to accurately detect when the slider 224 changes between the non-contact position and the contact position (in either direction), each slider 224 of the disk drive 10 can be calibrated to more precisely determine, monitor and/or adjust the head-to-disk spacing during various operations of the disk drive 10.

For example, as provided herein, the drive circuitry 218 can detect the approximate moment when actual, relatively consistent head-to-disk contact first occurs (changing from the non-contact position to the contact position). Alternatively, or in addition, the drive circuitry 218 can detect the approximate moment when the slider 224 is first withdrawn from relatively consistent contact with the storage disk 216 (changing from the contact position to the non-contact position).

Head-to-disk contact provides a "zero-clearance reference" that is used in various applications relative to head-to-disk spacing, as set forth herein. Once the zero-clearance reference is established, the drive circuitry 218 can monitor relative changes in the actual head-to-disk spacing, and can also accurately determine and facilitate adjustment of the actual head-to-disk spacing at any time during operation of the disk drive 10. Further, with this design, the disk drive 10 can operate at a more suitable head-to-disk spacings depending upon the specific operation being performed.

Head-to-disk contact can be induced by directing power to the slider mover 200 while the slider 224 is flying during rotation of the storage disk 216 to cause a portion of the slider 224 to deform toward the storage disk 216. Power to the slider mover 224 can be maintained or increased until head-to-disk contact is determined by one of the methods provided herein. Alternatively, head-to-disk contact can be induced by other methods, such as by use of an actuator means, by altering the rotational velocity of the storage disk, by altering the orientation of the slider relative to the storage disk, or by any other suitable method known to those skilled in the art.

Figure 2C:
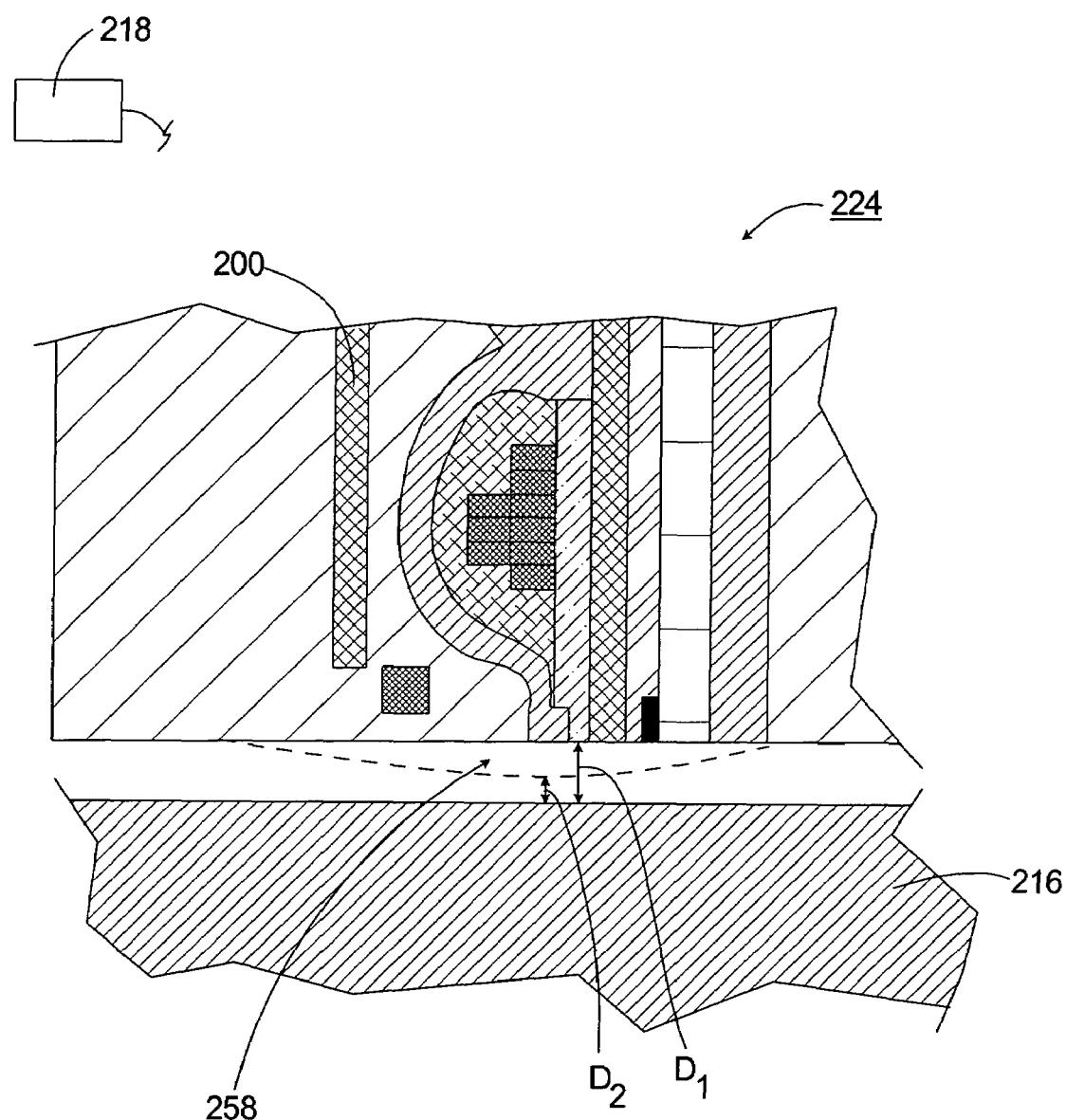
FIG. 2C is an enlarged cross-sectional view of a portion the slider of FIG. 2A while the first non-contact power level and a second non-contact power level are directed to the slider mover.

FIG. 2C illustrates the general relationship between the actual head-to-disk spacing $D_1$ when a first non-contact power level is directed to the slider mover 200, and the actual head-to-disk spacing $D_2$ when a second non-contact power level is directed to the slider mover 200. As described in greater detail below, the second non-contact power level can be any power level greater than the first non-contact power level, but which does not result in head-to-disk contact $D_C$ (illustrated in FIG. 2B). The second non-contact power level can be directed by the drive circuitry 218 (or other suitable controller) either following intentional head-to-disk contact (following or during calibration), or before any such head-to-disk contact has occurred in the disk drive, as described below.

Figure 3A:
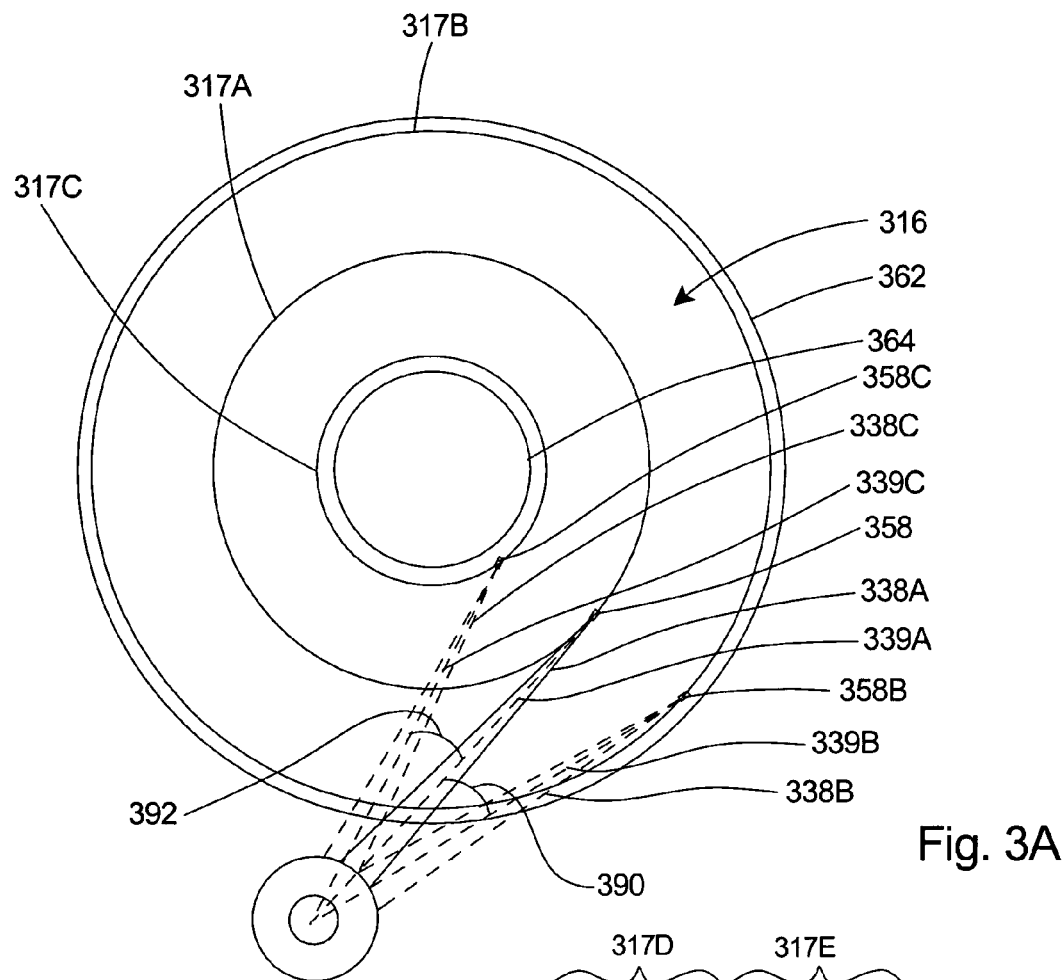
FIG. 3A is a simplified top view of a storage disk and an actuator arm illustrated at three different skew angles.

FIG. 3A is a simplified representation of a portion of a disk drive illustrating three different positions of an actuator arm 338A-C relative to the storage disk 316. The orientation of the actuator arm 338A-C relative to the storage disk 316 is also referred to herein as the skew angle. For example, at a zero skew angle, a longitudinal axis 339A of the actuator arm 338A in a first position forms a line tangent to a first track 317A at the point of track following by a read/write head 358A. Thus, when the read/write head 358A is positioned over the first track 317A, the actuator arm 338A is at the zero skew angle.

The actuator arm 338B is positioned at a positive skew angle 390 when the actuator arm 338B moves away from zero skew toward the outer diameter 362 of the storage disk 316. FIG. 3A shows the actuator arm 338B (in phantom) in a second position with the read/write head 358B positioned at a positive skew angle 390 over a second track 317B. Thus, a longitudinal axis 339B of the actuator arm 338B in a second position forms a line tangent to a second track 317B at the point of track following by the read/write head 358B.

The actuator arm 338C is positioned at a negative skew angle 392 when the actuator arm 338C moves away from zero skew toward an inner diameter 364 of the storage disk 316. FIG. 3A shows the actuator arm 338C (in phantom) in a third position with the read/write head 358C positioned at a negative skew angle 392 over a third track 317C. Thus, a longitudinal axis 339C of the actuator arm 338A in a third position forms a line tangent to a third track 317C at the point of track following by the read/write head 358C. The range of skew angles 390, 392 can vary depending upon the design requirements of the disk drive.

Figure 3B:
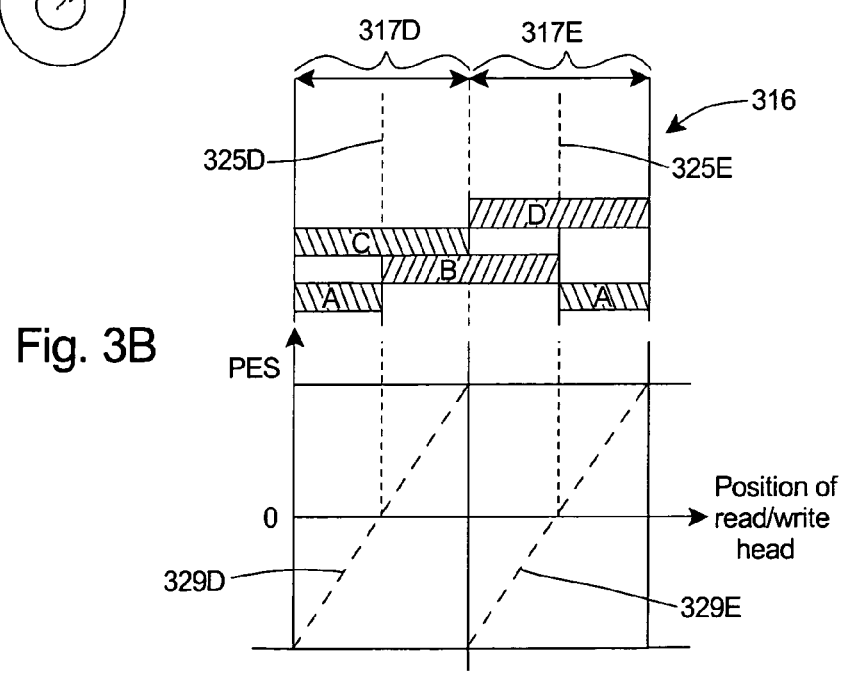
FIG. 3B is a representation of a portion of a first track and an adjacent second track of a storage disk in relation to a position error signal.

FIG. 3B is a representation of a portion of a first track 317D and an adjacent second track 317E of a storage disk 416, along with a graph of PES as a function of positioning of the read/write head. One method of determining the positioning accuracy of the read/write head relative to a centerline 325D of the first track 317D, for example, is by monitoring a position error signal ("PES") variance (also sometimes referred to herein as "modulation"). The PES (illustrated by dashed line 329D) is a voltage signal having an amplitude having an absolute value that generally increases as the read/write head moves further off the centerline 325D of the first track 317D.

In one embodiment of the present invention, changes between head-to-disk contact and non-head-to-disk contact can be determined by monitoring the PES variance at certain designated tracks (such as tracks 317D and 317E illustrated in FIG. 3B) on the storage disk 316. As an overview, the PES variance method essentially includes monitoring changes in the PES as an increasing or decreasing level of current is directed to the slider mover. In the embodiment using an increasing level of current, once the PES deviates by a predetermined amount from the PES during non-head-to-disk contact, head-to-disk contact can be assumed or definitively determined to have occurred. Conversely, in the embodiment that uses a decreasing level of current, once the PES deviates by a predetermined amount from the PES during head-to-disk contact, non-head-to-disk contact can be assumed or definitively determined to have occurred, as explained in greater detail below.

In one embodiment, the PES 329D can be derived from one or more servo burst patterns A-D positioned at fixed offsets from the centerline 325D of the first track 317A. Typically, the PES 329D is received by the drive circuitry, and this information can be used to adjust the positioning of the read/write head relative to the centerline 325D of the first track 317D. As used herein, the first track 317D and the second track 317E can be representative of any track on the storage disk 316.

Normally, when head-to-disk contact occurs at certain skew angles, a sudden change of direction of a force at the actuator arm occurs. Based on physics principles and/or experimental testing at certain ranges of skew angles on the storage disk 316, it is recognized that actual head-to-disk contact results in an increase in the likelihood that the head/write head will suddenly move away from a centerline 325D, 325E of the track 317D, 317E being followed.

For example, when the slider assembly is positioned near the inner diameter of the storage disk 316, because of the rotation of the storage disk 316 in relation to the negative skew angle, head-to-disk contact causes the slider assembly to suddenly move off-track in an outwardly direction. On the other hand, when the slider assembly is positioned near the outer diameter of the storage disk 316, because of the rotation of the storage disk 316 in relation to the positive skew angle, head-to-disk contact causes the slider assembly to suddenly move off-track in an inwardly direction. Rotation of the storage disk 316 in an opposite direction can yield results opposite from those provided above. This sudden movement of the slider assembly is detected by the servo system as a change and/or increase in the amplitude of the PES, which is detected very shortly after the sudden movement. For instance, the time constant of a PES change following head-to-disk contact can be on the order of approximately 0.3 milliseconds or less.

Stated another way, if the amplitude of the PES is a predetermined level greater than what would normally be expected at a given skew angle during track following by the read/write head, the likelihood that head-to-disk contact has occurred is increased. Generally, the greater the deviation in PES from the PES values expected during track following, the higher the confidence level is that head-to-disk contact has actually occurred. For example, if the PES exceeds the expected PES values at a given skew angle by at least a predetermined percentage, head-to-disk contact can be assumed with a relatively high degree of certainty. Alternatively, if the PES exceeds the expected PES values at a given skew angle by a greater predetermined percentage, the occurrence of head-to-disk contact can be definitively established. An evaluation and/or monitoring of PES to determine head-to-disk contact can include monitoring mean PES, peak PES, peak-to-peak PES, changes in PES and/or any other suitable PES criteria.

The specific skew angles that can be used for determining head-to-disk contact by monitoring PES variance can be varied. In one embodiment, the PES can be monitored and used to determine head-to-disk contact at any skew angle. Alternatively, this type of PES monitoring to assess head-to-disk contact can be used at non-zero skew angles, which can increase PES variance. Still alternatively, this type of PES monitoring to determine head-to-disk contact can be used at skew angles of greater than approximately positive one degree, and/or less than approximately negative one degree. In another embodiment, this type of PES monitoring to determine head-to-disk contact can be used at skew angles of greater than approximately positive five degrees, and/or less than approximately negative five degrees. It is recognized that deviations in the actual PES values from the expected PES values generally increases as the skew angle moves further from zero skew. Thus, with this method, head-to-disk contact can be more definitively determined the further from zero skew the actuator arm is positioned, e.g. more toward the inner or outer diameter of the storage disk 316.

In certain embodiments, the expected PES values and the percentage of variance from such values required to determine a change between head-to-disk contact and non-head-to-disk contact (in either direction) within a specific degree of certainty can be statistically or algorithmically calculated. Alternatively, the expected PES values and the percentage of variance from such values required to determine a change between head-to-disk contact and non-head-to-disk contact within a specific degree of certainty can be established through experimental testing.

In one embodiment, depending upon the skew angle, if the deviation of PES values from the PES values during track following is at least approximately 10%, head-to-disk contact can be assumed to have occurred. In alternative non-exclusive embodiments, depending upon the skew angle, if the deviation of PES values from the PES values during track following is at least approximately 1%, 5%, 20%, 30%, 40%, 50%, 75%, or 100%, the occurrence of head-to-disk contact can be assumed at a particular confidence of less than or up to 100%.

The PES can be monitored at varying levels of current directed to the slider mover, and thus, at varying amounts of power output of the slider mover. Further, the PES can be monitored at different skew angles. For example, at a given skew angle, the PES can first be monitored at a relatively low level of current, or when no current is directed to the slider mover. The current can be incrementally or otherwise gradually increased to lower a portion of the slider assembly toward the storage disk to decrease the head-to-disk spacing. The PES is monitored at each current level. Alternatively, as varying levels of current are applied to the slider mover, the PES can be monitored as a function of the power output of the slider mover.

As explained previously, as current to the slider mover is increased, the power output of the slider mover increases, causing a portion of the slider assembly near the read/write head to thermally expand toward the storage disk. However, at a certain current level directed to the slider mover, thermal expansion results in head-to-disk contact. At this point, a deviation from the expected PES value can be determined by the drive circuitry. Depending upon the extent of the deviation from the normal PES curve, a specific confidence level that head-to-disk contact has occurred can be established. By performing this type of monitoring process at various skew angles, the confidence level of head-to-disk contact at a given percentage of variance from the expected PES curve can effectively be increased.

Figure 3C:
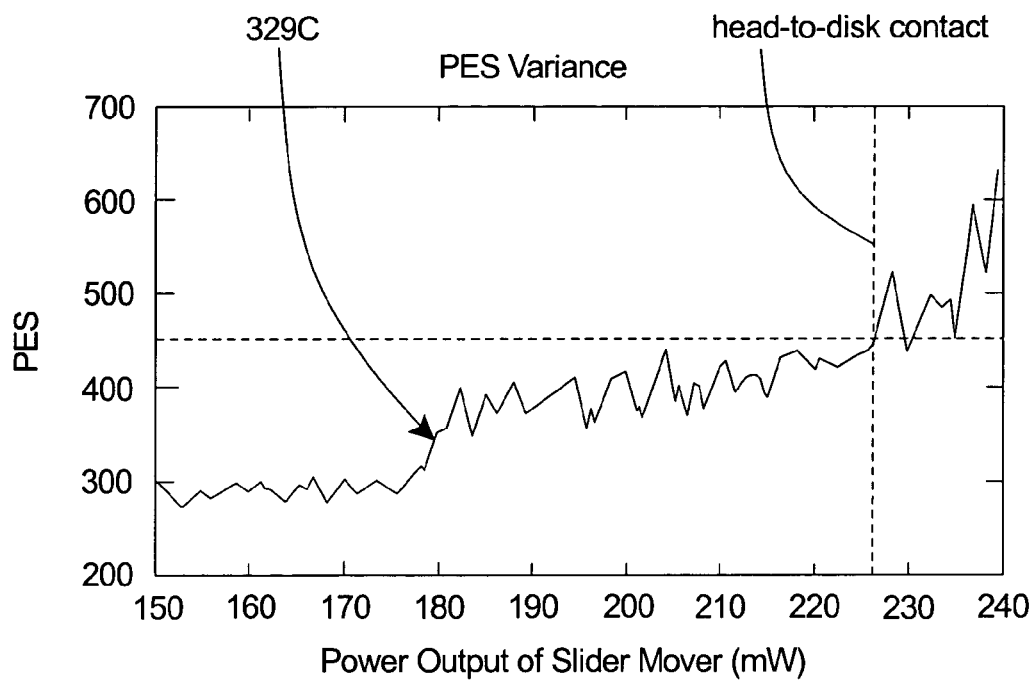
FIG. 3C is a graphical representation of the position error signal as a function of time, while alternately turning current on and off to the slider mover.

FIG. 3C is a graphical representation of PES 329C as a function of power output of the slider mover resulting from current directed to the slider mover by the drive circuitry. As the power output of the slider mover gradually increases, the change in PES 329C can be expected to be substantially linear or somewhat gradual. However, at a certain threshold point, the PES 329C increases significantly, indicating that the read/write head has moved away from the centerline of the track being followed. This significant change in PES 329C indicates that head-to-disk contact has occurred.

Thus, during manufacture and/or testing of a given disk drive, the level of current directed to the slider mover that will likely cause head-to-disk contact can be determined for any given slider assembly at any suitable skew angle. Further, during manufacture and/or testing, the level of current that will result in head-to-disk contact at various times during operation of the disk drive can be determined. For example, this information can be used in order to reduce the likelihood of unwanted head-to-disk contact during a read operation, a write operation or other types of operations, as examples.

Alternatively, or in conjunction with the above embodiment, head-to-disk contact can be detected using a synchronous PES method. As an overview, the synchronous PES method includes monitoring the modulation of the PES at various rotational locations on the storage disk, and is based on the specific frequency of rotation of the storage disk.

In one embodiment using the synchronous PES method, the PES can be monitored at any non-zero skew angle. In an alternative embodiment, the PES can be monitored at any skew angle having an absolute value of greater than approximately 1 degree. In another embodiment, the PES can be monitored at any skew angle having an absolute value of greater than approximately 5 degrees.

Using the synchronous PES method, monitoring of the PES is associated with the frequency of rotation of the storage disk. Because the rotation rate of the storage disk in the disk drive is known, in one embodiment, current to the slider mover to cause thermal expansion of the slider assembly can be turned on and off, or increased and decreased, based on this rotation rate. For example, at a particular skew angle, a specific level of current can be directed to the slider mover to cause thermal expansion of the slider assembly during every other revolution of the storage disk.

The duration of directing current to the slider mover can be approximately equal to the time required for the storage disk to rotate one complete revolution. For instance, in a disk drive having a storage disk that rotates at 7,200 revolutions per minute (120 Hz), the duration of each revolution is $1/120$ of a second. Therefore, in this embodiment, the duration of current being directed to the slider mover is also $1/120$ of a second, lasting for one complete revolution. In one embodiment, the current to the slider mover can then be arrested for $1/120$ of a second (the next revolution of the storage disk). Thus, the current to the slider mover commences once every $1/60$ of a second, and lasts for $1/120$ of a second before the current is arrested for $1/120$ of a second. This cyclic process can be repeated any number of times in succession, or with a time lag between such cycles.

Figure 3D:
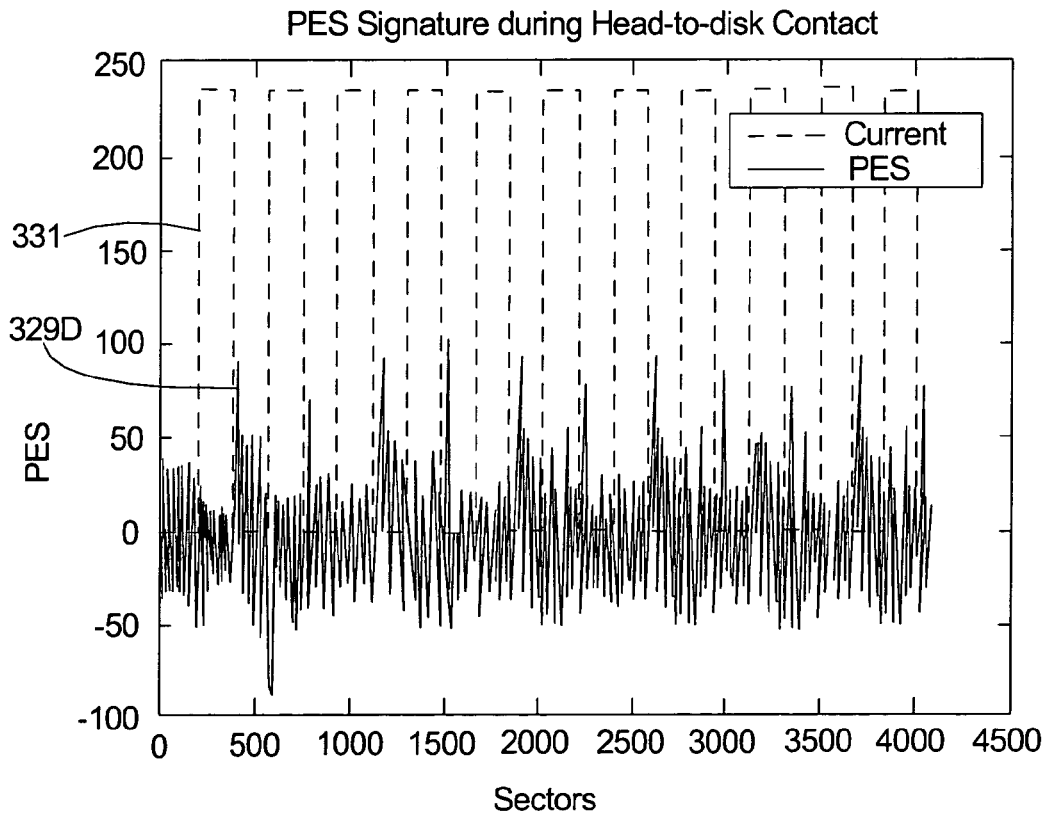
FIG. 3D is a graphical representation of the position error signal as a function of time, while alternately turning current on and off to the slider mover.

FIG. 3D is a graphical representation of the PES 329D as a function of time, while alternately turning current on and off to the slider mover. The current to the slider mover is illustrated by a square wave shown by dashed line 331. In FIG. 3D, time is measured by the number of servo sectors that are read by the read head. In this embodiment, each rotation of the storage disk includes reading approximately 200 servo sectors. Thus, in the embodiment represented by the graph in FIG. 6A, current is repeatedly directed to the slider mover for one complete revolution, then not directed to the slider mover for one complete revolution.

FIG. 3D illustrates that the amplitude of the PES 329D spikes immediately following a change in directing current to the slider mover. For example, when current to the slider mover is turned on, a nearly immediate spike in the amplitude of the PES 329D is detected. Moreover, when the current to the slider mover is turned off, a nearly immediate spike in the amplitude of the PES 329D in the opposite direction is detected. The spikes in the amplitude of the PES 329D which are detected by the servo system are attributable to one of two sudden changes: (1) head-to-disk contact has just occurred, or (2) the read/write head has just withdrawn from contact with the storage disk. Following each such spike, the servo system can adjust the positioning of the slider assembly, and thus the read/write head, which causes the amplitude of the PES 329D to diminish until the next change in directing current to the slider mover occurs at the predetermined interval, in this example.

Figure 3E:
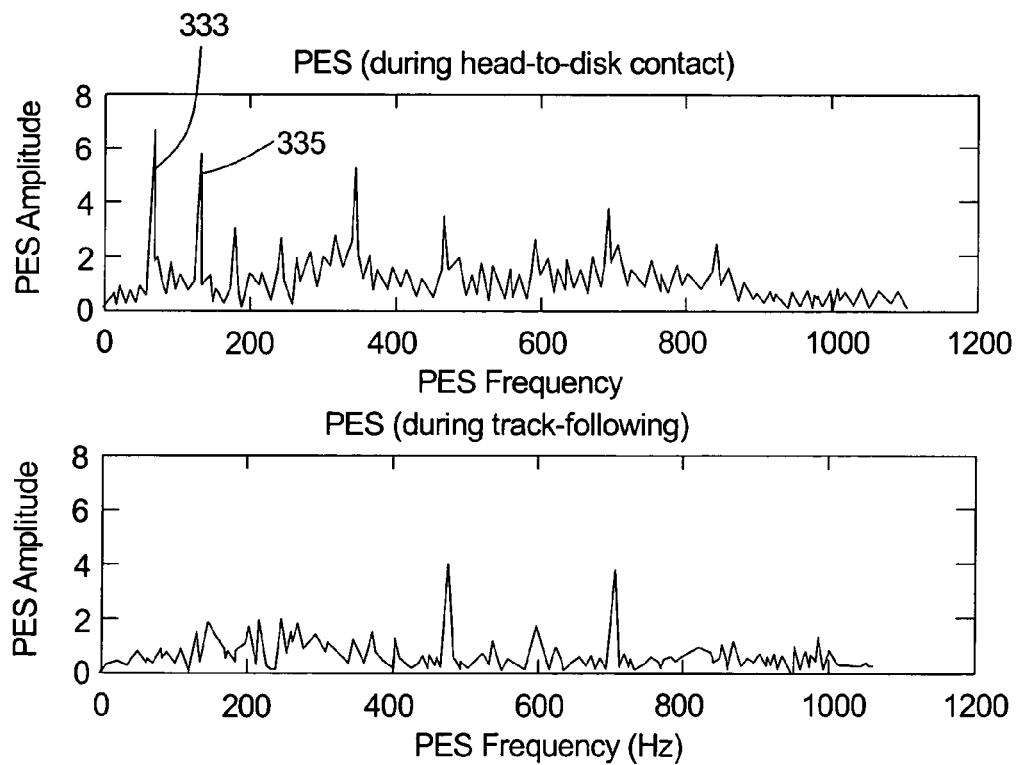
FIG. 3E is a graphical comparison of the amplitude of the position error signal as a function of the frequency of the position error signal, both during head-to-disk contact and during track following.

FIG. 3E illustrates graphical comparisons of the amplitude of the PES as a function of the frequency of the PES, both during head-to-disk contact and during track following. As shown in the upper graph in FIG. 3E, during head-to-disk contact, a spike 333 in the amplitude of the PES occurs at approximately 60 Hz because this is the fundamental frequency in this example. Stated another way, in this embodiment, current is directed to the slider mover once approximately every $\frac{1}{60}$ of a second (for a duration of $\frac{1}{120}$ of a second). Further, as explained above, a spike 335 in the amplitude of the PES occurs at a frequency of approximately 120 Hz because the drive circuitry is alternately turning directing current and arresting current to the slider mover every $\frac{1}{120}$ of a second. The harmonics of this system also cause short duration increases in the amplitude of the PES that continually diminish as the frequency increases beyond 120 Hz.

The lower graph in FIG. 3E illustrates that during track following, relatively little PES activity occurs at lower frequencies such as the fundamental frequency, and multiples of the fundamental frequency. In other words, the spikes 333, 335 in amplitude observed in the upper graph in FIG. 3E are not observed during track following. However, at somewhat higher frequencies, i.e. 240 Hz, 480 Hz, and 720 Hz, etc., relatively small increases in the amplitude of the PES do occur. Because the frequencies of these increases in the PES are several multiples higher than the fundamental frequency, and are similar to the increases observed in the upper graph in FIG. 3E at those same frequencies, such increases in amplitude are attributable to causes other than head-to-disk contact, e.g., causes related to disk rotation such as disk wobble, spindle motor noise, etc.

By repetitiously and consistently comparing PES with current to the slider mover alternately being turned on and off, extraneous noises that are unrelated to head-to-disk contact can basically be discounted or disregarded, leaving behind a relatively unique PES frequency pattern. This PES frequency pattern can be attributable to the occurrence of head-to-disk contact. With this design, because extraneous noise has effectively been removed from the analysis, the signal to noise ratio is increased, providing a more accurate determination of the timing of the onset of head-to-disk contact.

As used herein, convergence time is the point in time at which a definitive determination of head-to-disk contact occurs. Once the unique PES frequency pattern is identified, a single point method could be applied to speed up the convergence time of the sine and cosine coefficients as shown in the following equations:

$$B = \frac{2}{N\_HSEC \cdot REV} \sum_{i=1}^{REV} \sum_{k=0}^{2N-1} y(k)\cos\left(\frac{\pi}{N\_HSEC}k\right) \quad (1)$$

$$A = \frac{2}{N\_HSEC \cdot REV} \sum_{i=1}^{REV} \sum_{k=0}^{2N-1} y(k)\sin\left(\frac{\pi}{N\_HSEC}k\right)$$

where REV is an even number. Since only the amplitude in the synchronous PES method is important, the onset of head-to-disk contact can be determined by $A^2+B^2$ from equation 1 above.

Figure 3F:
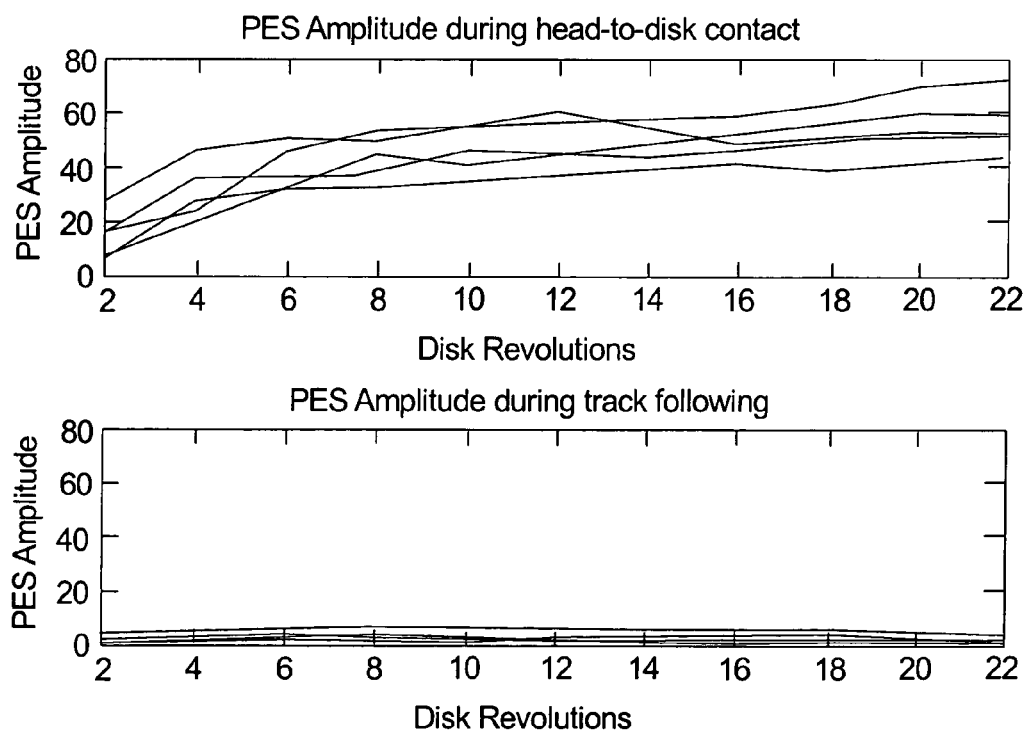
FIG. 3F is a graphical comparison of a convergence time for the amplitude of the position error signal as a function of revolutions of the storage disk, both during head-to-disk contact and during track following.

FIG. 3F graphically illustrates the convergence time of the amplitudes of the PES (upper graph in FIG. 3F), which occurs at approximately 20 revolutions. As used herein, the convergence time is the time (measured in number of revolutions of the storage disk) at which the amplitude of the PES levels off and remains relatively consistent. For example, in a disk drive having a storage disk that rotates at approximately 7,200 revolutions per minute, 20 revolutions translates to approximately one-sixth of a second. However, the amplitudes of the PES during track following (lower graph in FIG. 3F) are relatively small compared to the amplitudes of the PES during even the first several revolutions following directing current to the slider mover. Thus, as shown in the upper graph in FIG. 3F, in some embodiments, head-to-disk contact can be detected before 20 revolutions of the storage disk have occurred.

For example, in one embodiment, if the amplitude of the PES is a predetermined percentage larger than the PES during track following, the drive circuitry can determine that head-to-disk contact has occurred within as few as approximately two revolutions of the storage disk, or within approximately $\frac{1}{60}$ of a second. In another embodiment, the amplitude of the PES can be large enough for the drive circuitry to determine that head-to-disk contact has occurred within as few as approximately four revolutions, or within approximately $\frac{1}{30}$ of a second.

Further, in one embodiment of the synchronous PES method, at a given skew angle head-to-disk contact is determined to have occurred when the amplitude of the PES is at least approximately 10% greater than the amplitude of the PES during track following. In alternative non-exclusive embodiments, head-to-disk contact is determined to have occurred when the amplitude of the PES is at least approximately 1%, 5%, 20%, 50%, 100%, 200%, 300%, 400% or 500% greater than the amplitude of the PES during track following. An evaluation and/or monitoring of PES to determine head-to-disk contact can include monitoring mean PES, peak PES, peak-to-peak PES, changes in PES and/or any other suitable PES criteria.

Figure 3G:
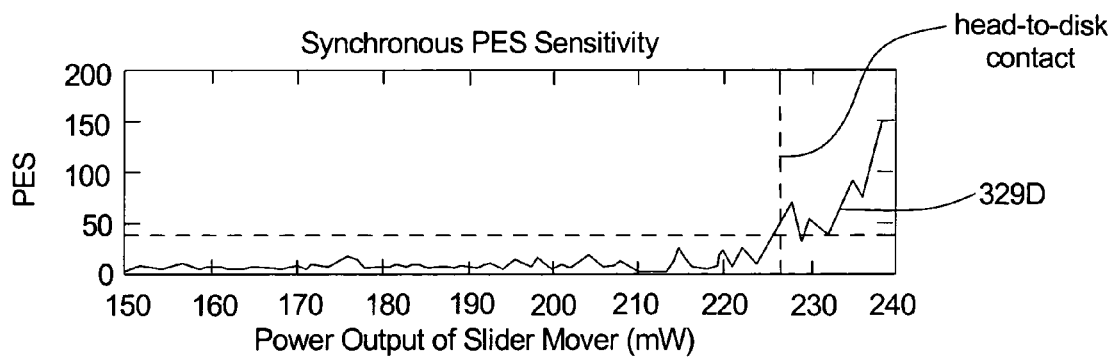
FIG. 3G is a graphical representation of the relationship between power output of the slider mover and the amplitude of the position error signal.

FIG. 3G is a graph showing the relationship between power output of the slider mover and the amplitude of the PES 329D. FIG. 3G illustrates that once a relatively low threshold of PES amplitude has been exceeded, head-to-disk contact can be determined to have occurred. In this example, as power output of the slider mover increases up to approximately 220 mW, relatively little change in a baseline PES amplitude occurs, indicative of no head-to-disk contact. However, at a level of between approximately 220-230 mW, a substantial increase in the PES amplitude as a function of percentage greater than baseline occurs. This easily noticeable increase in PES amplitude provides an early detection of head-to-disk contact. With this design, fewer revolutions of the storage disk are required to accurately ascertain the moment of head-to-disk contact, resulting in a decreased likelihood of damage to the slider assembly and/or the storage disk.

Using the synchronous PES method described herein, the change in positioning of the read/write head relative to the centerline of the track can be consistently analyzed because head-to-disk contact is repeatedly occurring at substantially the same location on the storage disk. Further, withdrawal of the read/write head from contact with the storage disk is also repeatedly occurring at substantially the same location on the storage disk. Because the extraneous noise is reduced, an accurate analysis can be performed by the drive circuitry to determine the moment of head-to-disk contact. With this design, a zero reference point, e.g. head-to-disk spacing equals 0 nm, is more precisely defined, which allows the drive circuitry to more accurately determine and adjust the in situ head-to-disk spacing.

In an alternative embodiment, current to the slider mover can be timed so that the current cyclically starts, stops and starts again at some multiple of the fundamental frequency of the storage disk, i.e. at 4.0, 2.0, 0.5, 0.25, 0.125, etc., times the fundamental frequency. For example, the current can be directed and arrested to the slider mover at a rate that is faster than the rotation rate of the storage disk, such as every $1/120$ of a second for $1/240$ of a second. In this embodiment, the storage disk rotates approximately one-half of a revolution while the current to the slider mover is on, and the next one-half of a revolution while the current to the slider mover is off. This cycle is repeated as many times as necessary.

In another embodiment, the current directed to the slider mover can be turned on at a rate that is slower than the rotation rate of the storage disk, such as every $1/30$ of a second for $1/60$ of a second. In this embodiment, the storage disk rotates approximately two revolutions while the current to the slider mover is on, and the next two revolutions while the current to the slider mover is off, repeating as necessary. In still an alternative embodiment, the cyclic on/off directing of current to the slider assembly can be unrelated to the rotation rate of the storage disk, provided the timing of the "on" cycle is relatively consistent.

The location of head-to-disk contact and the location of withdrawal of head-to-disk contact can be substantially the same location on the storage disk, or the location of head-to-disk contact and the location of withdrawal of head-to-disk contact can be different. Accordingly, a consistent portion of the designated track or tracks are used for determining head-to-disk contact, which can provide more accurate results. Moreover, using the synchronous PES method, current directed to the slider mover repeatedly occurs when the read/write head is positioned in substantially the same location relative to a revolution of the storage disk. Stated another way, head-to-disk contact can be repetitiously analyzed over substantially the same disk topography rather than attempting to analyze PES to determine head-to-disk contact at random and changing locations on the storage disk.

In still another embodiment, changes between head-to-disk contact and non-head-to-disk contact can be detected using a null current method. The approximate moment in time of a change between head-to-disk contact and non-head-to-disk contact can be determined by monitoring at least a portion of the current directed toward the actuator motor 34 (illustrated in FIG. 1) which is based on servo information received by the drive circuitry. This current is used to adjust the positioning of the read/write head relative to one or more designated tracks (such as tracks 317D and 317E illustrated in FIG. 3B) on the storage disk 316. In this embodiment, when the position error signal has exceeded a predetermined threshold level, the drive circuitry directs current to the actuator motor to compensate for any off-track movement (which is reflected in a PES spike) to drive the PES toward zero and maintain the PES as close to zero as possible.

In this embodiment, monitoring the current directed toward the actuator motor 34 as a result of servo signals such as PES can result in a more steady-state observation over a period of time, i.e. $1/120^{th}$ of a second, $1/240^{th}$ of a second, $1/60^{th}$ of a second, etc. Stated another way, the current directed toward the actuator motor 34 adjusts the position of the read/write head, and maintains this positioning until a further change in PES occurs, at which point the current is readjusted and maintained.

Figure 3H:
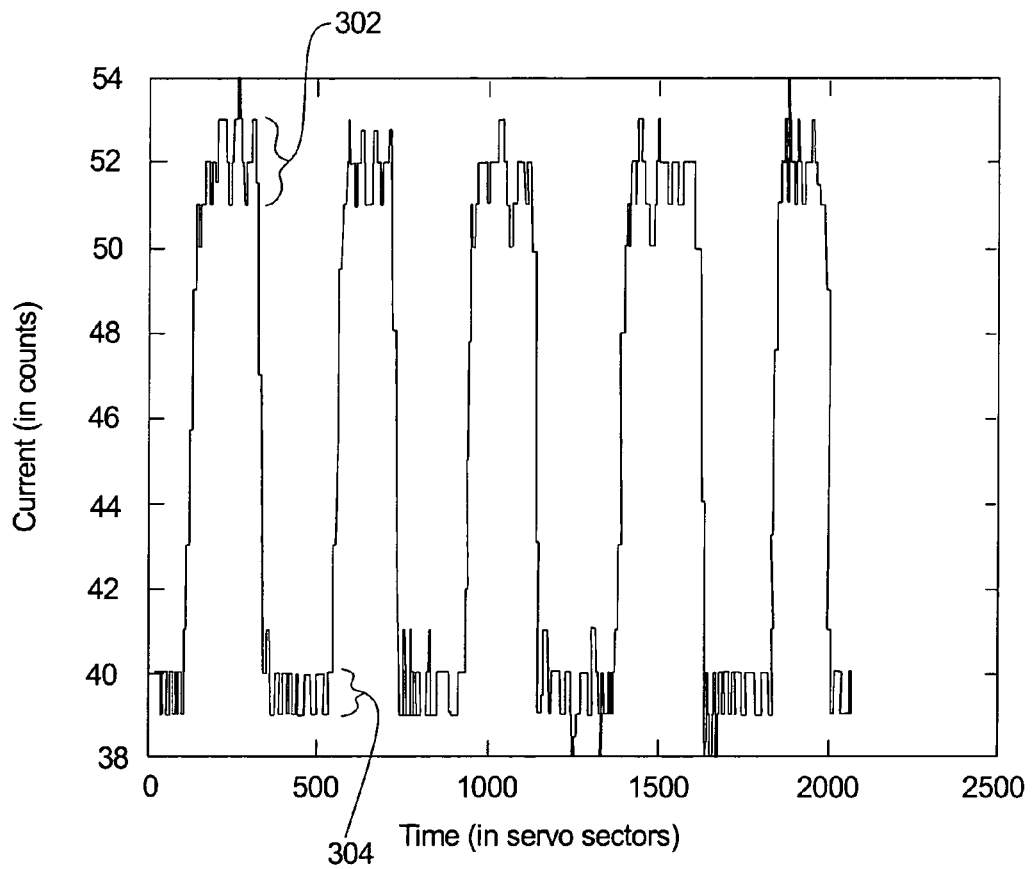
FIG. 3H is a graphical representation of the relationship between current to an actuator motor of the disk drive caused by changes in position error signal as a function of time.

FIG. 3H is a graphical representation of current directed toward the actuator motor 34 as a result of PES information received by the drive circuitry as a function of time for a given level of power that is alternately turned on and off to the slider mover 200 (illustrated in FIG. 2A). In FIG. 3H, time is measured by the number of servo sectors that are read by the read head. In this embodiment, each rotation of the storage disk includes reading approximately 200 servo sectors. Thus, in this example, the power to the slider mover 200 is alternately on for approximately $1/120^{th}$ of a second (approximately 1 revolution of the storage disk) and off for approximately $1/120^{th}$ of a second.

The current directed toward the actuator motor 34 to adjust for changes in PES is at least partially determined by an integrator signal that resides in the firmware of the disk drive. Stated another way, in this embodiment, the current directed toward the actuator motor 34 is basically an integrated output of the PES. Each "count" of the integrator signal corresponds to a predetermined level of current that is directed to the actuator motor 34. For example, in one embodiment, each count of the integrator signal equals approximately 55 microamps of current, although the level of current per count can vary. The resultant current to the actuator motor 34 is substantially a square wave, representing more of a steady-state level.

Although FIG. 3H illustrates an example where the timing is somewhat similar to the synchronous PES embodiment previously described, it is recognized that such alternating on/off timing is not required for the null current method. Stated in another manner, because the current to the actuator motor is relatively constant following a change in PES over a designated track until another change in PES occurs, the current provides a unique signature for the drive circuitry to determine whether or not a change between head-to-disk contact and non-head-to-disk contact has occurred.

In essence, the current changes between two basic levels based on a bi-directional change in the PES: a first level 302 (illustrated at approximately 51-53 counts in FIG. 3H) that causes a first bias force resulting in rotation of the actuator assembly in a first direction, and a second level 304 (illustrated at approximately 39-40 counts in FIG. 3H) that causes a second bias force resulting in rotation of the actuator assembly in a second direction that is opposite the first direction. If the drive circuitry detects that the read/write head has moved off-track in one direction, current is directed to the actuator motor to rotate the actuator assembly in the opposite direction to bring the PES toward zero. It is recognized that the first level 302 and second level 304 can vary depending upon the design of the disk drive, and that the values of current included in FIG. 3E are provided for representative purposes and ease of discussion only.

In one embodiment, if the deviation between the first level 302 and the second level 304 directed to the actuator motor as a result of the changes in PES is at least approximately 10%, a change in the head-to-disk contact status can be assumed to have occurred. In alternative, non-exclusive embodiments, if the deviation between the first level 302 and the second level 304 directed to the actuator motor as a result of the changes in PES is at least approximately 1%, 5%, 20%, 30%, 40%, 50%, 75%, or 100%, a change in the head-to-disk contact status can be assumed to have occurred at a particular confidence of less than or up to 100%.

By determining the timing of the transition between the first level 302 and the second level 304, and factoring in a time constant to initiate the current to the actuator motor caused by the change in PES information, an accurate determination of the approximate moment of transition between head-to-disk contact and non-head-to-disk contact (in either direction) can be ascertained.

Head-to-disk contact can also be detected by a readback voltage amplitude method. The readback voltage amplitude method includes monitoring the readback voltage amplitude while systematically directing current to the slider mover during rotation of the storage disk. It is understood in the art that the strength of the magnetic field of the storage disk increases exponentially as detected by the read/write head as the head-to-disk spacing decreases linearly. This increase in the magnetic field results in a corresponding, proportional exponential increase in the readback voltage amplitude. In alternative embodiments, the monitoring of readback voltage amplitude can be performed using a variable gain control servo signal (VGAS) or a variable gain control data readback signal (VGAR). Further, the readback voltage amplitude method can be used at any skew angle.

Figure 3I:
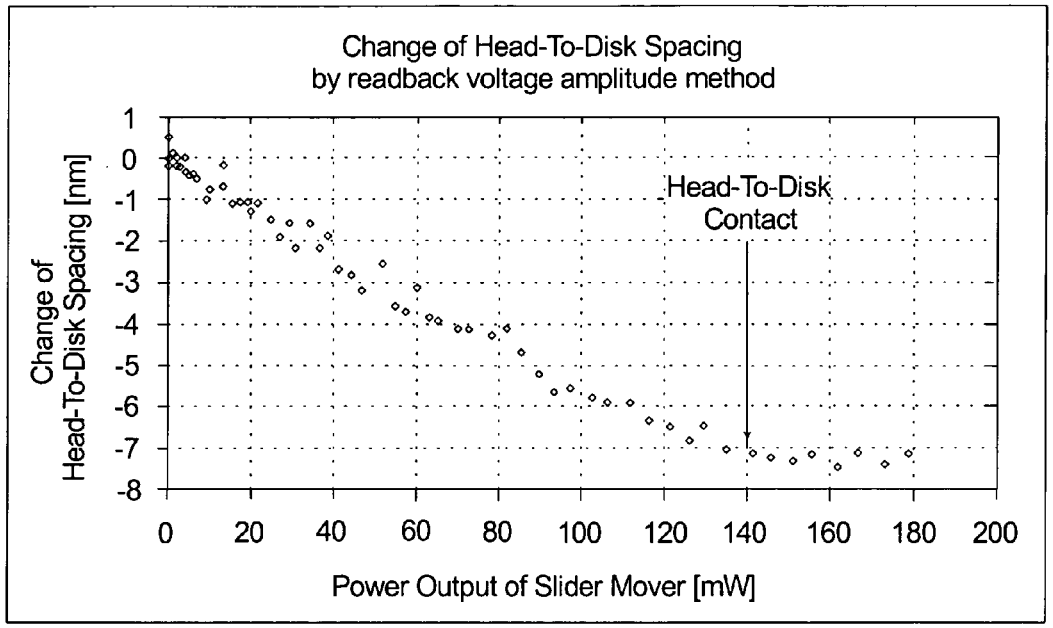
FIG. 3I is a graphical representation of change in head-to-disk spacing as a function of power directed to the slider mover.
Figure 3J:
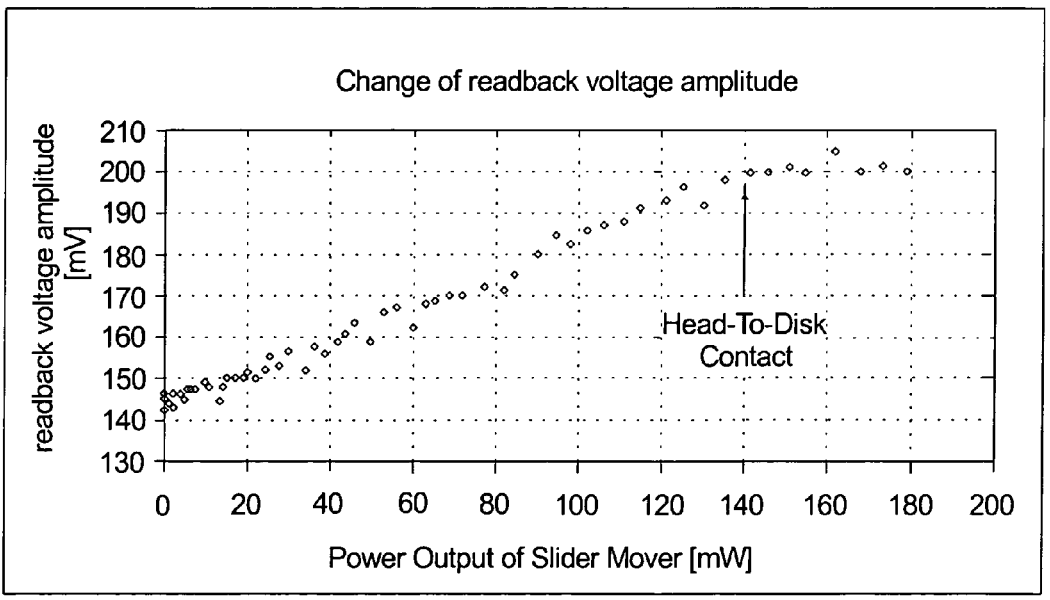
FIG. 3J is a graphical representation of readback voltage amplitude as a function of power directed to the slider mover.

FIGS. 3I and 3J show two related graphs illustrating the relationship between head-to-disk spacing (FIG. 3I) and readback voltage amplitude (FIG. 3J), which is also sometimes referred to as an amplitude of a variable gain amplifier (VGA) signal, as a function of power output of the slider mover. An increase in the level of current to the slider mover causes the power output of the slider mover likewise to increase. As illustrated in FIG. 3I, this increase in power results in a decrease in head-to-disk spacing (shown as an increasingly negative change in head-to-disk spacing) due to the thermal expansion of the slider assembly. Once head-to-disk contact occurs, a further increase in the level of current to the slider mover (and thus the power output of the slider mover) does not result in any further substantial change in the head-to-disk spacing.

As illustrated in FIG. 3J, the increase in power, and thus, the decrease in head-to-disk spacing, results in an increase in the readback voltage amplitude until head-to-disk contact occurs. Consequently, at this point, the readback voltage amplitude likewise does not substantially change, as illustrated by the substantially level section of data points at approximately 200 mV in FIG. 3J.

Therefore, head-to-disk contact can be determined by gradually or incrementally increasing current to the slider mover to increase the power output of the slider mover, and monitoring the readback voltage amplitude. Once the readback voltage amplitude no longer increases with a corresponding increase in current to the slider mover, head-to-disk contact can be determined to have occurred.

Various methods of determining head-to-disk contact are described in copending U.S. patent application Ser. No. 11/101,112, filed by Schreck, et al. on Apr. 7, 2005, and assigned to Maxtor Corporation. To the extent permitted, the contents of U.S. patent application Ser. No. 11/101,112 are incorporated herein by reference.

With each of the methods of determining the approximate moment when the read/write head moves between head-to-disk contact and non-head-to-disk contact, detection of relatively inconsistent or anomalous contact is inhibited. The described methods detect when contact between the read/write head and the storage disk has a duration greater than that which normally occurs during contact with a thermal asperity or other surface deviation, as set forth previously. However, this does not limit the disk drive from having other means of detecting these shorter duration types of anomalous contacts between the read/write head and the storage disk, which may be used for other purposes.

Figure 3K:
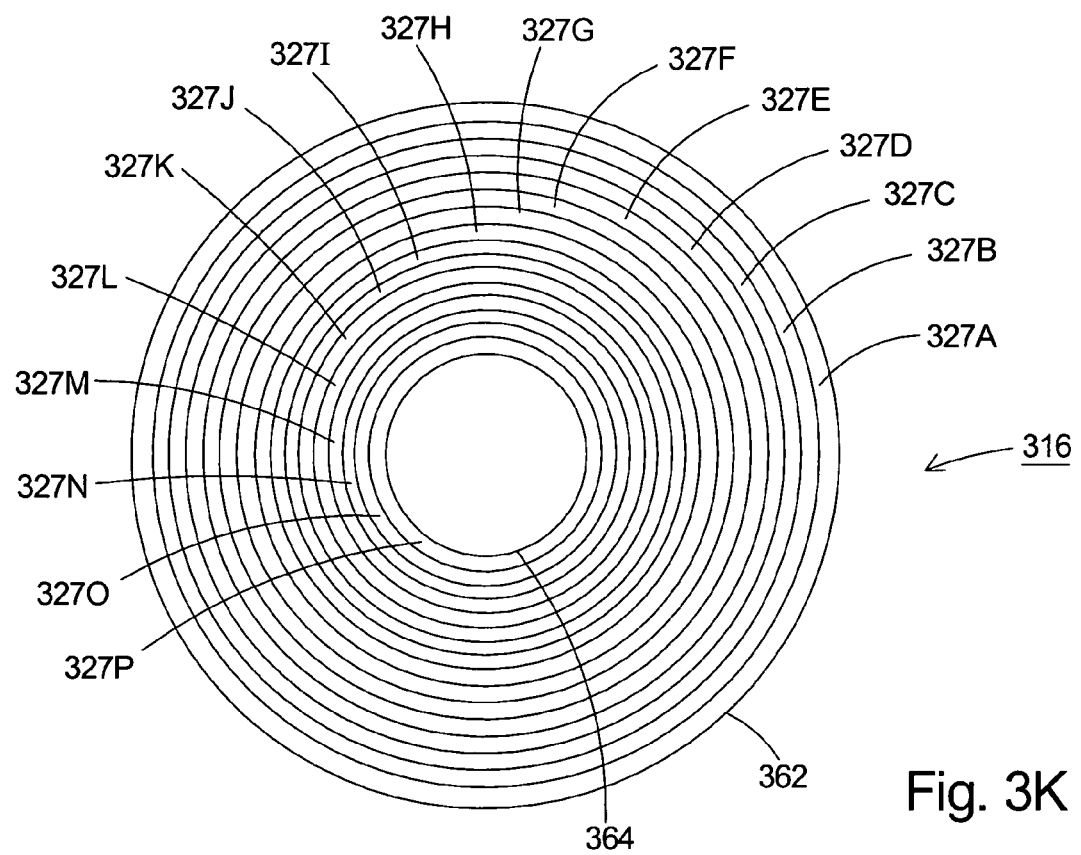
FIG. 3K is a top view of a storage disk illustrating a plurality of disk zones.

FIG. 3K is a top view of a storage disk 316 illustrating a plurality of disk zones 327A-P (also referred to simply as "zones") of varying radii. One or more specific zones on the storage disk 316 can be used for monitoring and detecting head-to-disk contact. For example, in one embodiment, the determination of head-to-disk contact can be performed at three different zones, with each zone including one or more designated tracks. These designated tracks can be designed to allowing head-to-disk contact, and may not contain data which could otherwise be lost. Alternatively, the designated tracks can be standard data tracks or servo tracks, as non-exclusive examples. In one embodiment, the three zones include an outer zone 327A located near the outer diameter 362, an inner zone 327P located near the inner diameter 364, and a middle zone 327E located between the outer zone 327A and the inner zone 327P.

The data from these three zones 327A, 327E, 327P can be interpolated for the other zones of the storage disk 316 positioned adjacent to or between these zones 327A, 327E, 327P so that the occurrence of head-to-disk contact in these other zones can be determined and eventually used by the drive circuitry to monitor and/or adjust head-to-disk spacing. The interpolation can be substantially linear or it can incorporate some other suitable non-linear algorithm or formula. Depending upon the location of the selected zones 327A-P, extrapolation can be used in addition to interpolation, or in the alternative.

Alternatively, the determination of head-to-disk contact can be performed on designated tracks in greater or fewer than three zones. For example, in another embodiment, head-to-disk contact can be determined in 16 different substantially concentric zones positioned between the inner diameter and the outer diameter of the storage disk 316.

Once relatively consistent head-to-disk contact has been detected using any of the methods described herein, for a given skew angle, the drive circuitry can measure, calculate or otherwise determine the amplitude of the variable gain amplifier signal for a read channel (VGAR) or a servo channel (VGAS). These signals are also sometimes referred to generically either as VGA signals or as readback voltage amplitudes. Further, VGA signals for head-to-disk contact can be determined at varying skew angles.

Once VGA signals for head-to-disk contact have been determined in a plurality of zones and/or on a plurality of tracks on the storage disk, these zero-clearance references can be "mapped" by interpolation and/or extrapolation, and can be stored by the drive circuitry for use during monitoring and/or adjusting of head-to-disk spacing. With this design, expected VGA signals at a head-to-disk spacing of 0 nm can be determined and/or stored for any radial position on the storage disk. For example, these expected VGA signals can be stored in a look-up table in the memory or firmware of the disk drive.

In one embodiment, from this zero clearance reference, power to the slider mover can be decreased in increments or in an otherwise predetermined manner to raise the read/write head off of the disk surface, thereby increasing the actual head-to-disk spacing. Based on a change in the VGA signal, the actual head-to-disk spacing can be calculated and calibrated for varying levels of power to the slider mover based on the change in amplitude of the VGA signal and/or the radial position over the storage disk, as described herein. It is recognized that other known methods of increasing or otherwise changing the actual head-to-disk spacing can be used during this calibration process. However, for consistency and ease of discussion, adjustment of the actual head-to-disk spacing is described herein through use of the slider mover.

In order to determine the actual head-to-disk spacing, once the zero-reference has been established, the Wallace Spacing Loss equation can be utilized. One form of the basic Wallace Spacing Loss equation is as follows:

$$A = C^* e^{(-2\pi dF/v)},$$

where A≡track amplitude; C≡is an unknown constant; F≡fundamental frequency of the data pattern; v≡velocity of the read/write head relative to the storage disk; and d≡magnetic spacing (also referred to herein as "head-to-disk spacing"). Note that the constant, C, is not dependent on d but is dependent upon F and v.

Thus, in terms of VGA, the drive circuitry can use one or more algorithms to accurately determine actual head-to-disk spacing as a function of VGA, as follows:

$$A = C^* e^{(-2\pi dF/v)} \quad [1]$$

$$\log(A) = \log(C) - \log(e)(2\pi dF/v) \quad [2]$$

In one embodiment, $$(20*256/24)\log(A) = (20*256/24)\log(C) - \log(e)(20*256/24)(2\pi dF/v) \quad [3]$$

$$VGA = (20*256/24)\log(C) - \log(e)(20*256/24)(2\pi dF/v) \quad [4]$$

In-order to remove the term involving the unknown C, measurements can be taken at two different values of actual head-to-disk spacing that are referred to herein as $d_0$ and $d_1$.

$$VGA[d_1] = (20*256/24)\log(C) - \log(e)(20*256/24)(2\pi d1 F/v) \quad [5]$$

$$VGA[d_0] = (20*256/24)\log(C) - \log(e)(20*256/24)(2\pi d0 F/v) \quad [6]$$

$$VGA[d_1] - VGA[d_0] = -\log(e)(20*256/24)(2\pi F/v)(d_1 - d_0) \quad [7]$$

In working up this data, $d_0$ is set to the magnetic spacing when current to the slider mover=0, also referred to as a non-contact level of current ($RSS_0$). Further, $d_1$ represents the magnetic spacing when current to the slider mover is at a value of greater than 0, also referred to as a contact level of current ($RSS_1$). It follows that ($d_1 - d_0$) is the change in actual head-to-disk spacing caused by the change between the contact level of current and the non-contact level of current.

$$VGA[RSS_1] - VGA[RSS_0] = -\log(e)(20*256/24)(2\pi F/v)(FHA[RSS_1]), \quad [8]$$

where FHA[$RSS_1$] is the fly height adjust actuation at the non-contact level of current to the slider mover.

If $\Delta VGA[RSS_1]$ is $VGA[RSS_1] - VGA[RSS_0]$, then:

$$\Delta VGA[RSS_1] = -\log(e)(20*256/24)(2\pi F/v)(FHA[RSS_1]) \quad [9]$$

FHA[$RSS_1$] is then calculated from the measured $\Delta VGA[RSS_1]$ as follows:

$$FHA[RSS_1] = ((24*\ln(10)*v)/(20*256*2\pi F))\Delta VGA[RSS_1] \quad [10]$$

Using this equation each test track or any other track can be used to independently measure FHA[$RSS_1$]. The measurements would substantially agree with one another at least within the noise level of the measurement.

Following the Wallace Spacing Loss equation, equation [9] provides for two other methods of extracting FHA[$RSS_1$] from the dataset. FHA[$RSS_1$] can be obtained from the slope of $\Delta VGA[RSS_1]$ plotted versus F at constant v or from the slope of $\Delta VGA[RSS_1]$ plotted versus 1/v at constant F. Both of these plots ideally are linear with zero intercept.

The two methods of slope based FHA[$RSS_1$] calculation can be simplified by defining two new quantities that are referred to herein as frequency normalized VGA (fnVGA) and velocity normalized VGA (vnVGA). These two quantities are defined herein as follows:

$$vnVGA[RSS_1] \equiv (24*\ln(10)*v)/(2\pi*20*256)\Delta VGA[RSS_1] \quad [11]$$

$$fnVGA[RSS_1] \equiv (24*\ln(10)*)/(20*256*2\pi F)\Delta VGA[RSS_1] \quad [12]$$

It then follows from equation [9] that:

$$vnVGA[RSS_1] = FHA[RSS_1]*F \text{ and} \quad [13]$$

$$fnVGA[RSS_1] = FHA[RSS_1]*(1/v) \quad [14]$$

Equation [13] can be used to extract a measure of FHA [$RSS_1$] at each of the test locations, with one or more of the test locations having a varying range of frequencies, such as from 50 MHz up to 197.5 MHz, for example.

Equation [14] can be used to extract a measure of FHA [$RSS_1$] using the data written radially across the drive at a series of fixed frequencies having a varying range, such as from 50 MHz up to 197.5 MHz, for example.

In summary, the above equations allow a determination of not only the change in head-to-disk spacing [$d_1 - d_0$] following actuation of the read/write head relative to the storage disk, but also allow an accurate determination of the actual head-to-disk spacing [$d_N$] at any given time, and/or any given radial location of any of the read/write heads relative to the corresponding storage disk. Once the zero reference [$d_0$] is determined at any particular location on the storage disk, a corresponding VGA[$d_0$] amplitude is measured, calculated or otherwise determined. In other words, when the actual head-to-disk spacing is 0 nm, the VGA[$d_0$] amplitude is measured, communicated to the drive circuitry and stored. In other words, the VGA[$d_0$] amplitude is known, permitting application of the equations provided above to determine the actual head-to-disk spacing [$d_1$] at an initially unknown head-to-disk spacing.

When the actual head-to-disk spacing increases from 0 nm as a result of any suitable method which can include a decrease in current directed to the slider mover, for example, the VGA amplitude also changes from VGA[$d_0$] to VGA[$d_1$]. This change in VGA, e.g., VGA[$d_0 - d_1$], is applied to the Wallace Spacing Loss equations provided above to yield an accurate determination of the actual head-to-disk spacing [$d_1$] at any point in time during operation of the disk drive. It is recognized that this determination can be independently performed for any or all of the read/write heads in the disk drive, and is not limited to any one read/write head.

In one embodiment, VGA measurements can be taken at multiple frequencies and/or multiple radial locations relative to the storage disk. Use of equations [13] and [14] can be used to determine actual head-to-disk spacing. The two frequency form of the head-to-disk spacing measurement is detailed in equation [15], as follows:

$$d_1 - d_0 = (24*\ln(10)*)/(20*256*2\pi(F_2 - F_1))(VGA[F_2, D_1] - VGA[F_1, D_1] + VGA[F_1, D_0] - VGA[F_2, D_1]) \quad [15]$$

Monitoring of the actual head-to-disk spacing by the drive circuitry can occur periodically at timed intervals during use of the disk drive. Alternatively, monitoring can occur before, during or after certain events, such as at startup, and/or transitions between various operations of the disk drive and/or other designated triggering events. Still alternatively, monitoring of the head-to-disk spacing can occur constantly or on an instantaneous basis.

In addition, once the zero reference has been established, a systematic process can occur that incorporates the methods provided herein to facilitate calibration of the actual head-todisk spacing of one or more read/write heads. This calibration can be based on one or more of the VGA amplitude signals, the level of current directed to the slider mover via the drive circuitry, and the radial positioning of the read/write head relative to the storage disk. Further, by using interpolation and/or extrapolation, the calibration of head-to-disk spacing is not limited to certain zones or to areas of the storage disk having designated test tracks.

Once the drive circuitry can determine and/or monitor the actual head-to-disk spacing for a particular read/write head, the specific level of current necessary to invoke a change in the actual head-to-disk spacing can be determined and implemented. For example, once the drive circuitry has determined that the read/write head has an actual head-to-disk spacing of 6 nm, and a desired head-to-disk spacing of 5 nm, by coordination between the drive circuitry and the slider mover, the head-to-disk spacing can be decreased to the desired level. In one embodiment, the current to the slider mover can be increased until the pre-calibrated VGA amplitude is measured by the slider and communicated to the drive circuitry, at which point the current to the slider mover is adjusted to maintain the desired VGA amplitude, and thus, the desired head-to-disk spacing.

In an alternative embodiment, if a decrease in the head-to-disk spacing of 1 nm is desired from the present head-to-disk spacing, the drive circuitry directs a pre-calibrated level of current to the slider mover. In this embodiment, the newly reached head-to-disk spacing can be monitored and/or confirmed by comparing the actual VGA amplitude at one or more frequencies or radii with an expected calibrated VGA amplitude at one or more frequencies or radii. For instance, if a change in head-to-disk spacing from 5 nm to 4 nm has been calculated using the equations provided herein to result in an expected VGA amplitude, the measured VGA amplitude can be compared to this expected VGA amplitude to check the actual head-to-disk spacing. If a significant discrepancy is found, the drive circuitry can change the level of current to the slider mover accordingly, and the VGA amplitude can be checked again. This process can be repeated as necessary to force the actual head-to-disk spacing as close to the desired head-to-disk spacing as practicable.

A further application of the present invention includes accurately determining the extent of EPTP and/or WPTP of any or all of the read/write heads once calibration of the read/write heads relative to each respective storage disk has occurred as provided herein. For example, if a specific known level of power is directed to the slider mover while the drive is relatively cold, a known VGA amplitude is expected. Once the drive heats up, the VGA amplitude can change, even though no change in power to the slider mover has occurred and no write operation is presently taking place. In one embodiment, this change can be attributed to EPTP caused by an overall increase in temperature of the disk drive. The extent of the EPTP, e.g., the specific distance that the read/write head protrudes toward the storage disk, can be determined by the drive circuitry based on the change in VGA amplitude, as provided above. In this embodiment, the change in VGA amplitude is not attributable to head-to-disk spacing changes because a constant level of power is being directed, if at all, to the slider mover, and because no writing (thus, no WPTP) is occurring.

Moreover, if a specific known power level is directed to the slider mover once the drive has reached an equilibrium operating temperature but prior to a write operation, a known VGA amplitude is expected. Once a write operation commences, the VGA amplitude can change, even though no change in power to the slider mover has occurred. In one embodiment, this change can be attributed to WPTP caused by an increase in temperature of the read/write head. The specific distance that the read/write head is protruding toward the storage disk is determined by the drive circuitry based on the change in VGA amplitude, as provided above. In this embodiment, the change in VGA amplitude is not attributable to head-to-disk spacing changes because the power level being directed to the slider mover, if any, is substantially constant.

With this information, as discussed below, the drive circuitry can determine if the head-to-disk spacing is either too small or too great, and can adjust the power level to the slider mover accordingly. Additionally, the power level to the slider mover can be coordinated with the timing of read and/or write operations (or any other drive operation) to better adjust the head-to-disk spacing for better reading and/or writing accuracy.

In another embodiment, the drive circuitry can determine whether or not a deviation exists between the expected VGA amplitude and the actual VGA amplitude as a result of changes in altitude of the disk drive. For example, it is well known that an increase in altitude typically results in a decreased head-to-disk spacing. Using the methods provided herein, the actual head-to-disk spacing can be determined by the drive circuitry at any altitude. The drive circuitry can then compensate for the difference in head-to-disk spacing between the disk drive at sea level and at altitude by decreasing the power level directed to the slider mover by an appropriate amount based on the equations provided herein, and relevant derivatives of these equations. Conversely, the drive circuitry can increase the power level to the slider mover by an appropriate amount, or other means of lowering the head-to-disk spacing can be employed, if the ambient pressure increases.

As provided herein, the slider mover can be calibrated using one or more of the methods that include causing controlled head-to-disk contact. However, prior to such calibration, the present invention allows for controlled movement of a portion of the slider relative to the storage disk using the slider mover. Such movement or deformation can be desirable to increase the accuracy, precision and/or reliability of certain operations during manufacturing by decreasing the head-to-disk spacing, as described below. This controlled movement or deformation of a portion of the slider can be accomplished utilizing an open loop method. Stated another way, the head-to-disk spacing of a specific head in a disk drive can be adjusted prior to or in the absence of intentionally causing head-to-disk contact using that particular head, or using that particular disk drive. This adjustment of the head-to-disk spacing can occur at any time during or following manufacture of the disk drive.

The level of power (also referred to herein as an "operational power level") that the drive circuitry delivers to the slider mover during certain manufacturing steps or post-manufacturing drive operations, and thus, the resulting change in head-to-disk spacing, can vary depending upon the type of step or operation being performed. In one embodiment, the drive circuitry can deliver power to the slider mover of one or more specific disk drives based on the information or other data compiled from the calibration of other similar disk drives and/or other similar heads. For example, head-to-disk contact and subsequent calibration of one or more disk drives of a particular model of disk drive or family of disk drives can first be performed. Alternatively, head-to-disk contact and subsequent calibration of one or more heads relative to a storage surface of a storage disk within a particular disk drive can be performed.

During any such calibration process, a specific, predictable power level or range of power levels (also referred to herein as an "incremental power level") can be ascertained that results in a predetermined incremental change in the head-to-disk spacing of the drives (or heads within one or more drives). As an example, a range of incremental power levels for a plurality of disk drives can be established by this process to increase or decrease the head-to-disk spacing by approximately 0.1 nm, 0.5 nm, 1.0 nm, 1.5 nm, 2.0 nm, 3.0 nm, or any other appropriate increment.

FIG. 4A is a table showing representative results for one non-exclusive example of an increase in incremental power level to the slider mover that is necessary to decrease the head-to-disk spacing of one or more heads within one or more disk drives of a particular type of drive by 1.5 nm, from 7.5 nm to 6.0 nm. Although the discussion herein focuses on the power levels to the slider mover, FIG. 4A shows that other signals, information and/or data such as the readback voltage amplitude can also be monitored and/or recorded to determine approximately when the head-to-disk spacing has decreased by a suitable increment, such as 1.5 nm.

In FIG. 4A, a head that has not been calibrated by controlled head-to-disk contact is represented by $H_X$, while the head or heads that have been calibrated by controlled head-to-disk contact are represented individually as $H_1$ and collectively as $H_2$ through $H_n$. In one manifestation of the present invention, heads $H_1, H_2, \ldots, H_n$ are substantially similar to head $H_X$. Further, in one embodiment, these calibrated heads are included within substantially similar disk drives as head $H_X$. As used herein, the term "substantially similar" can mean that the heads are intended for use in the same or similar model disk drive, the same family of disk drives, the same manufacturer of disk drives and/or with the same size and/or capacity of storage disk, as non-exclusive examples.

Once the incremental power level of $H_1$ or range of incremental power levels of $H_2$ through $H_n$ is established, any suitable operational power level that is based on this power level or range of power levels can be used by the drive circuitry in the disk drive (or other suitable controller) that has not been calibrated. Thus, in this example, the drive circuitry can deliver the operational power level to the slider mover to reduce the head-to-disk spacing by approximately 1.5 nm, to a second non-contact level $D_2$ (illustrated in FIG. 2C) during various manufacturing steps, or during post-manufacturing drive operation.

Because unintentional head-to-disk contact is not desirable, the change in head-to-disk spacing in the uncalibrated disk drive can be conservative since the exact head-to-disk spacing has not yet been definitively determined at this point. Therefore, in one embodiment, once a range of incremental power levels has been established for the calibrated drives, the drive circuitry (or other controller) of the uncalibrated drive can utilize an operational power level that is equal to the average incremental power level times a constant. In another embodiment, the uncalibrated drive can utilize an operational power level that is equal to the incremental power level at the lower end of the range of incremental power levels.

In one embodiment, a statistical analysis can be performed to determine a conservative, but effective, operational power level to adopt from the range of incremental power levels provided. For example, the operational power level used in the uncalibrated drive can be the low incremental power level in the range. In non-exclusive, alternative embodiments, the operational power level can be approximately 1%, 5%, 10%, 20%, 30%, 40% or 50% below the lowest incremental power level in the range, below the mean incremental power level in the range, above the lowest incremental power level in the range or above the mean incremental power level in the range. In other alternative embodiments, the operational power level can be approximately 1%, 5%, 10%, 20%, 30%, 40% or 50% below the highest incremental power level in the range. Still alternatively, the operational power level can be approximately 1%, 5%, 10%, 20%, 30%, 40% or 50% above the highest incremental power level in the range.

For instance, referring to FIG. 4A, the operational power level can be determined by the drive circuitry to be the same as the incremental power level delivered to the slider mover associated with a calibrated head $H_1$ (22 mW). Alternatively, the operational power level can be determined by the drive circuitry to be a multiplier, e.g. 0.9, times the incremental power level (22 mW) delivered to the slider mover associated with a calibrated head $H_1$ (19.8 mW). Still alternatively, the operational power level can be determined by the drive circuitry to be a multiplier, e.g. 0.9, times the lower endpoint of the range of incremental power levels (18-24 mW) delivered to the slider mover associated with the plurality of calibrated heads $H_2$ through $H_n$ (16.2 mW). Still alternatively, the operational power level can be some percentage times the mean of incremental power levels (e.g., 21.3 mW) in the range, or 19.17 mW in the example provided in FIG. 4A. It is recognized that the foregoing examples are for the purpose of illustration only, and are not intended to be limiting in any manner.

In yet another embodiment, the drive circuitry can determine the appropriate operational power level depending upon the distribution of incremental power levels. For example, the drive circuitry can determine that the appropriate operational power level is a function of a number of standard deviations from the mean incremental power level for the slider movers in the calibrated drives. In non-exclusive alternative embodiments, the operational power level can be 0.5, 1.0, 1.5, 2.0, 2.5 or 3.0 standard deviations below the mean incremental power level. Still alternatively, another suitable statistical determination for the appropriate operational power level can be utilized.

Further, it may be necessary to manipulate the data from the incremental power level or range of incremental power levels depending upon the specific operation being performed by the uncalibrated drive. For instance, some of the incremental power levels in the range may be excluded, such as certain anomalous incremental power levels. It is recognized that any suitable statistical analysis can be performed on the range of incremental power levels to determine the appropriate operational power level for a given manufacturing step or post-manufacturing operation.

In certain embodiments, the ability to change the head-to-disk spacing during manufacturing, i.e. before or during self-test, and/or during optimization processing, can be provide various benefits. More specifically, it may be desirable to decrease the head-to-disk spacing of an entire population of drives, or an entire population of heads within one or more drives for a particular step during manufacturing. For example, the distribution of head-to-disk spacings for a population of drives (or heads within one or more drives) is set in order to inhibit the likelihood of post-manufacture, in-situ head-to-disk contact at increased or maximum operating temperatures when WPTP causes a reduced head-to-disk spacing. For this type of normal in-situ operation of the drive, an extra margin is built into the head-to-disk spacing population for times of increased operating temperatures that could otherwise result in undesirable head-to-disk contact.

However, during the manufacturing process, the drives run at relatively cool temperatures compared with during post-manufacture, in-situ drive operations. Therefore, it can be advantageous to reduce the head-to-disk spacing for an entire population of drives (or heads within one or more drives) during certain relatively low temperature manufacturing processes with the knowledge that there is this built-in, extra margin used during relatively high temperature operations. During these manufacturing operations, the drive circuitry can increase power to the slider mover to decrease the head-to-disk spacing.

FIG. 4B is a graphical representation of a typical, initial head-to-disk spacing distribution for approximately 10,000 substantially similar heads in a plurality of substantially similar disk drives during one or more drive operations. In FIG. 4B, the nominal head-to-disk spacing is 7.50 nm. The distribution includes a range from 4.80 nm to 10.17 nm, with 11 heads falling outside this range. From the results of this distribution, one determination could be that for these types of heads and/or this type of drive, it would be safe to decrease the head-to-disk spacing for the entire population of heads by 1.5 nm for one or more particular manufacturing or post-manufacturing drive operation.

FIG. 4C is a graphical representation of the expected head-to-disk spacing distribution for the 10,000 substantially similar heads in the plurality of substantially similar disk drives represented in FIG. 4B following an open loop decrease in head-to-disk spacing by approximately 1.5 nm. FIG. 4C shows that the expected low end of the range of head-to-disk spacings is approximately 3.30 nm. This head-to-disk spacing will provide a greater accuracy in the manufacturing process or in the drive operation being performed, while also providing sufficient clearance without substantially increasing tribological concerns. It is recognized that the foregoing example could have used a decrease in head-to-disk spacing of any suitable distance greater or less than 1.5 nm, as required by the disk drives.

Among other applications, during manufacturing of the drive, the drive circuitry can alternately or simultaneously direct an operational power level to the slider mover and the read/write head before, during or after writing servo information or base code to the storage disk, testing components of the read/write head (e.g., Dynamic Electrical Test), or during any other manufacturing operation in order to achieve and/or maintain the desired head-to-disk spacing.

More specifically, in one embodiment during manufacturing of the drive, an initial servo writing process occurs. This process can include mounting a newly assembled disk drive on a servowriter (not shown) in a clean room. A fairly rough servo pattern is first written to the storage disk at a relatively low drive temperature while in the clean room. Depending upon the density of information that is to be written to the storage disk, decreasing the head-to-disk spacing can be beneficial. Thus, in this embodiment, the drive circuitry can cause an increase in the operational power level to the slider mover to decrease the head-to-disk spacing during this operation. Once this initial servo writing process is completed, a more detailed servo pattern can be written to the disk outside the clean room, e.g., on a rack.

In another embodiment, base code is written to the storage disk (also known as "script writing") before a self-test process. The base code can include base operating instructions that are written to various cylinders of the storage disk, which are then read by the drive when the drive is powered up. During writing of the base code, the drive circuitry can cause an increase in the operational power level to the slider mover to decrease the head-to-disk spacing.

The foregoing embodiments are merely examples of various manufacturing operations that can benefit from use of the present invention described herein. It is recognized that decreasing the head-to-disk spacing as described herein can be used at any time during manufacturing or post-manufacturing operation when it is beneficial to have a decreased head-to-disk spacing.

It is further recognized that it may be advantageous to increase the head-to-disk spacing during various manufacturing or post-manufacturing processes or operations. At such times, the present invention can be equally effective in controlling and/or adjusting the head-to-disk spacing. For example, certain operations, e.g., various read operations or an idle mode, do not require the precision that may be necessary during writing of information or other data to the storage disk. During these operations, the drive circuitry can reduce the operational power level to the slider mover to cause an increase in the head-to-disk spacing, thereby decreasing the likelihood of unwanted head-to-disk contact.

While the particular invention is described in detail herein, it is to be understood that it is merely illustrative of various embodiments of the invention. No limitations are intended to the details of construction or design herein shown other than as described in the appended claims.

What is claimed is:

1. A method for manufacturing a first disk drive, the method comprising the steps of:
    incorporating a first storage disk having a first storage surface, and a first slider having a first read/write head into the first disk drive, the first read/write head being movably positioned a first head-to-disk spacing relative to the first storage surface, the first slider comprising a first slider mover that forms a portion of the first slider;
    providing a second storage surface and a second slider comprising a second slider mover forming a portion thereof and a second read/write head moveably positioned a second head-to-disk spacing relative to the second storage surface;
    determining an incremental power level necessary to be delivered to the second slider mover of the second slider to adjust the second head-to-disk spacing of the second read/write head relative to the second storage surface by a predetermined increment; and
    adjusting the first head-to-disk spacing by directing an operational power level to the first slider mover, the operational power level being based on the incremental power level.

2. The method of claim 1 further comprising the step of incorporating the second slider into the first disk drive.

3. The method of claim 1 wherein the second slider is positioned within a second disk drive.

4. The method of claim 3 wherein the second disk drive is substantially similar to the first disk drive.

5. The method of claim 1 wherein the first storage disk includes the second storage surface.

6. The method of claim 1 wherein the second storage surface is positioned on a second storage disk in the first disk drive.

7. The method of claim 1 wherein the step of adjusting includes multiplying the incremental power level by a constant to determine the operational power level.

8. The method of claim 7 wherein the constant is less than 1.

9. The method of claim 1 wherein the step of determining an incremental power level includes determining a range of incremental power levels to a plurality of slider movers necessary to change a plurality of head-to-disk spacings by the predetermined increment.

10. The method of claim 9 wherein the step of adjusting includes basing the operational power level on an average of the range of incremental power levels.

11. The method of claim 9 wherein the step of adjusting includes basing the operational power level on an average of the range of incremental power levels multiplied by a constant.

12. The method of claim 11 wherein the constant is less than 1.

13. The method of claim 9 wherein the step of adjusting includes basing the operational power level on one of the incremental power levels within the range of incremental power levels.

14. The method of claim 13 wherein the step of adjusting includes multiplying the one incremental power level by a constant.

15. The method of claim 9 wherein the plurality of slider movers are positioned within a plurality of disk drives that are substantially similar to the first disk drive.

16. The method of claim 1 wherein the step of adjusting includes directing the operational power level to the first slider mover to decrease the first head-to-disk spacing.

17. The method of claim 1 wherein the step of adjusting is performed during a manufacturing operation of the first disk drive.

18. The method of claim 17 wherein the manufacturing operation includes writing servo information to the first storage disk.

19. The method of claim 1 wherein the step of determining an incremental power level includes directing power to the second slider mover and detecting approximately when a portion of the second slider first contacts the second storage surface.

20. The method of claim 19 wherein the step of detecting includes monitoring an amplitude of a position error signal.

21. The method of claim 20 wherein the step of directing power to the second slider mover includes directing a plurality of pulses to the second slider mover at a pulse frequency that is a multiple of a rotation frequency of the second storage surface.

22. The method of claim 19 wherein the step of detecting includes the step of monitoring current that is directed to an actuator motor that positions the second slider relative to the second storage surface.

23. The method of claim 22 wherein at least a portion of the current to the actuator motor being monitored is dependent upon an amplitude of a position error signal from the second slider.

24. The method of claim 1, wherein the first slider mover comprises a slider deformer configured to selectively deform a portion of the first slider near the first read/write head.

25. The method of claim 1, wherein the first slider mover comprises a heating element.

26. The method of claim 1, wherein the first slider mover is positioned on the first slider as a planar layer substantially parallel to a trailing surface of the first slider.

27. The method of claim 1, wherein determining the necessary incremental power level comprises reducing a signal-to-noise ratio in a position error signal by repetitiously comparing the position error signal with a current to the second slider mover.

28. The method of claim 1, wherein determining the necessary incremental power level comprises using a single point method to speed up a convergence time of amplitudes of a position error signal.

29. A method for manufacturing a first disk drive, the method comprising the steps of:

providing a first slider including a first read/write head that magnetically interacts with a first storage surface of a first storage disk of the first disk drive;

directing an operational power level to a first slider mover that forms a portion of the first slider to move at least the portion of the first slider to adjust a first head-to-disk spacing during a manufacturing operation of the first disk drive without causing head-to-disk contact;

determining an incremental power level necessary to be delivered to a second slider mover of a second slider having a second read/write head to adjust a second head-to-disk spacing relative to a second storage surface by a predetermined increment; and basing the operational power level on the incremental power level.

30. The method of claim 29 wherein the manufacturing operation includes writing servo information to the first storage disk.

31. The method of claim 29 wherein the manufacturing operation includes testing one or more components of the first read/write head.

32. The method of claim 29 wherein the second slider is positioned within a second disk drive.

33. The method of claim 32 wherein the second disk drive is substantially similar to the first disk drive.

34. The method of claim 29 wherein the step of basing includes multiplying the incremental power level by a constant to determine the operational power level.

35. The method of claim 29 wherein the step of determining an incremental power level includes determining a range of incremental power levels to a plurality of slider movers necessary to change a plurality of head-to-disk spacings by the predetermined increment.

36. The method of claim 35 wherein the step of basing includes basing the operational power level on an average of the range of incremental power levels.

37. The method of claim 35 wherein the step of basing includes basing the operational power level on an average of the range of incremental power levels multiplied by a constant.

38. The method of claim 35 wherein the step of basing includes basing the operational power level on one of the incremental power levels within the range of incremental power levels.

39. The method of claim 38 wherein the step of basing includes multiplying the one incremental power level by a constant.

40. The method of claim 29 wherein the step of determining an incremental power level includes directing power to the second slider mover and detecting approximately when a portion of the second slider first contacts the second storage surface.

41. The method of claim 40 wherein the step of detecting includes monitoring an amplitude of a position error signal.

42. The method of claim 41 wherein the step of directing power to the second slider mover includes directing a plurality of pulses to the second slider mover at a pulse frequency that is a multiple of a rotation frequency of the second storage surface.

43. The method of claim 40 wherein the step of detecting includes the step of monitoring current that is directed to an actuator motor that positions the second slider relative to the second storage surface.

44. The method of claim 43 wherein at least a portion of the current to the actuator motor being monitored is dependent upon an amplitude of a position error signal from the second slider.

45. The method of claim 29 wherein the step of directing an operational power level includes decreasing the first head-to-disk spacing.

46. A method for manufacturing a first disk drive, the method comprising the steps of:
  providing a first storage surface and a first slider comprising a first slider mover and a first read/write head moveably positioned a first head-to-disk spacing relative to the first storage surface, the first slider mover forming a portion of the first slider;
  providing a second storage surface and a second slider comprising a second slider mover and a second read/write head moveably positioned a second head-to-disk spacing relative to the second storage surface, the second slider mover forming a portion of the second slider;
  determining an incremental power level that is directed to the second slider mover of the second slider that is necessary to change the second head-to-disk spacing of the second read/write head relative to the second storage surface by a predetermined increment; and
  determining an operational power level to the first slider mover to move the first slider to change the first head-to-disk spacing, the operational power level being based on the incremental power level.

47. The method of claim 46 wherein the second slider is positioned within a second disk drive.

48. The method of claim 47 wherein the second disk drive is substantially similar to the first disk drive.

49. The method of claim 46 wherein the step of determining an operational power level includes multiplying the incremental power level by a constant.

50. The method of claim 46 wherein the step of determining an operational power level includes directing the operational power level to the first slider mover so that the first head-to-disk spacing decreases.

51. The method of claim 50 wherein the step of directing is performed during a manufacturing operation of the first disk drive.

52. The method of claim 51 wherein the manufacturing operation includes writing servo information to the first storage disk.

53. The method of claim 46 wherein the step of determining an incremental power level includes directing power to the second slider mover and detecting approximately when a portion of the second slider first contacts the second storage surface.

54. The method of claim 53 wherein the step of detecting includes monitoring an amplitude of a position error signal.

55. The method of claim 54 wherein the step of directing power to the second slider mover, includes directing a plurality of pulses to the second slider mover at a pulse frequency that is a multiple of a rotation frequency of the second storage surface.

56. The method of claim 53 wherein the step of detecting includes the step of monitoring current that is directed to an actuator motor that positions the second slider relative to the second storage surface.

57. The method of claim 56 wherein at least a portion of the current to the actuator motor being monitored is dependent upon an amplitude of a position error signal from the second slider.

* * * * *